(12) United States Patent
Tsuchiya

(10) Patent No.: US 11,980,854 B2
(45) Date of Patent: May 14, 2024

(54) LIQUID SUPPLY APPARATUS

(71) Applicant: AQUASOLUTION CORPORATION, Nagano (JP)

(72) Inventor: Yukihiro Tsuchiya, Nagano (JP)

(73) Assignee: AQUASOLUTION CORPORATION, Nagano (JP)

( * ) Notice: Subject to any disclaimer, the term of this patent is extended or adjusted under 35 U.S.C. 154(b) by 496 days.

(21) Appl. No.: 17/057,009

(22) PCT Filed: May 29, 2019

(86) PCT No.: PCT/JP2019/021242
§ 371 (c)(1),
(2) Date: Nov. 19, 2020

(87) PCT Pub. No.: WO2019/230775
PCT Pub. Date: Dec. 5, 2019

(65) Prior Publication Data
US 2021/0106957 A1 Apr. 15, 2021

(30) Foreign Application Priority Data

May 30, 2018 (JP) .................................. 2018-103008
Dec. 25, 2018 (JP) .................................. 2018-241196

(51) Int. Cl.
*B01F 25/314* (2022.01)
*B01F 23/231* (2022.01)
(Continued)

(52) U.S. Cl.
CPC ...... *B01F 25/314* (2022.01); *B01F 23/23121* (2022.01); *B01F 23/2375* (2022.01);
(Continued)

(58) Field of Classification Search
CPC .. B01F 23/23121; B01F 25/12; B01F 25/314; B01F 35/718051; B01F 2101/04; B01F 23/2375; A01G 25/00; A01K 63/042
(Continued)

(56) References Cited

U.S. PATENT DOCUMENTS 6,676,837 B2 * 1/2004 Keeton, Jr. ......... B01F 35/2132
  210/220
7,255,332 B2 * 8/2007 Osborn ............. B01F 25/31331
  261/115
(Continued)

FOREIGN PATENT DOCUMENTS

CN 105280528 A 1/2016
EP 2 534 946 A1 12/2012
(Continued)

OTHER PUBLICATIONS

English Translation of JP 2011-4990 (Year: 2011).*
(Continued)

*Primary Examiner* — Charles S Bushey
(74) *Attorney, Agent, or Firm* — Rimon P.C.

(57) ABSTRACT

Provided is a liquid supply apparatus which is capable of directly taking in a liquid from a flow channel and appropriately mixing a gas into the liquid when generating-nanobubbles in the liquid using an ultrafine bubble generating apparatus. The liquid supply apparatus comprises a flow channel for a liquid supplied from a liquid supply source and an ultrafine bubble generating apparatus for generating nanobubbles in the liquid. The ultrafine bubble generating apparatus is provided with: a liquid ejector for ejecting the liquid taken in from the flow channel; a gas mixer for pressurizing and mixing a gas into the liquid ejected from the liquid ejector; and a nanobubble-generating nozzle for generating nanobubbles in the liquid by passing the liquid with intermixed gas therethrough. The pressure of
(Continued)

the liquid in the flow channel flowing into the liquid ejector from the upstream-side of the liquid ejector is a positive pressure and, between the liquid ejector and the-nanobubble-generating nozzle, the gas mixer pressurizes and mixes the gas into the liquid, which is flowing in a pressurized state toward the nanobubble-generating nozzle.

12 Claims, 12 Drawing Sheets

(51) Int. Cl.
    *B01F 23/2375* (2022.01)
    *B01F 25/00* (2022.01)
    *B01F 35/71* (2022.01)
    *A01G 25/00* (2006.01)
    *A01K 63/04* (2006.01)
    *B01F 101/04* (2022.01)

(52) U.S. Cl.
    CPC ...... *B01F 25/12* (2022.01); *B01F 35/718051* (2022.01); *A01G 25/00* (2013.01); *A01K 63/042* (2013.01); *B01F 2101/04* (2022.01)

(58) Field of Classification Search
    USPC .................................................... 261/76, 77
    See application file for complete search history.

(56) References Cited

U.S. PATENT DOCUMENTS

| | | |
|---|---|---|
| 2012/0024784 A1 | 2/2012 | Clark et al. |
| 2012/0126436 A1 | 5/2012 | Hato |
| 2015/0273408 A1* | 10/2015 | Tachibana ........... B01F 35/3204 366/162.4 |
| 2016/0013080 A1 | 1/2016 | Kim et al. |
| 2017/0216800 A1 | 8/2017 | Jizaimaru et al. |
| 2019/0134574 A1 | 5/2019 | Tsuchiya et al. |

FOREIGN PATENT DOCUMENTS

| | | | |
|---|---|---|---|
| JP | 02-131165 U | | 10/1990 |
| JP | 03-44715 A | | 2/1991 |
| JP | 2000-325767 A | | 11/2000 |
| JP | 2007-185615 A | | 7/2007 |
| JP | 3139460 U | | 2/2008 |
| JP | 2009-254984 A | | 11/2009 |
| JP | 2011-4990 | * | 1/2011 |
| JP | 2011-062632 A | | 3/2011 |
| JP | 2013-034958 A | | 2/2013 |
| JP | 2013-166143 A | | 8/2013 |
| JP | 2014-161241 A | | 9/2014 |
| JP | 6129390 | * | 4/2017 |
| JP | 2017-131852 A | | 8/2017 |
| KR | 101176988 B1 | | 8/2012 |
| WO | 2011/048935 A1 | | 4/2011 |
| WO | WO 2016/006636 A1 | * | 1/2016 |
| WO | 2018/020701 A1 | | 2/2018 |

OTHER PUBLICATIONS

English Translation of WO 2016/006636 A1 (Year: 2016).*
English Translation of JP 6129390 (Year: 2017).*
International Search Report issued in corresponding International Patent Application No. PCT/JP2019/021242, dated Aug. 27, 2019, with English translation.
Extended European Search Report issued in corresponding European Patent Application No. 19810924.1-1101, dated Jun. 10, 2021.

* cited by examiner

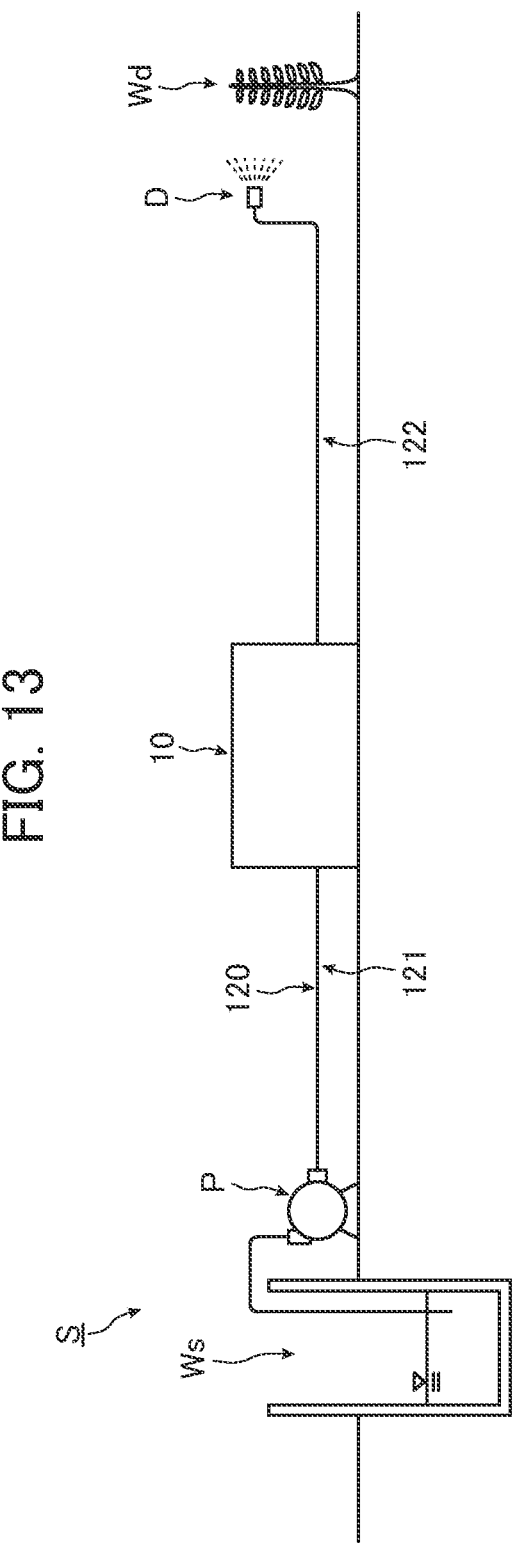

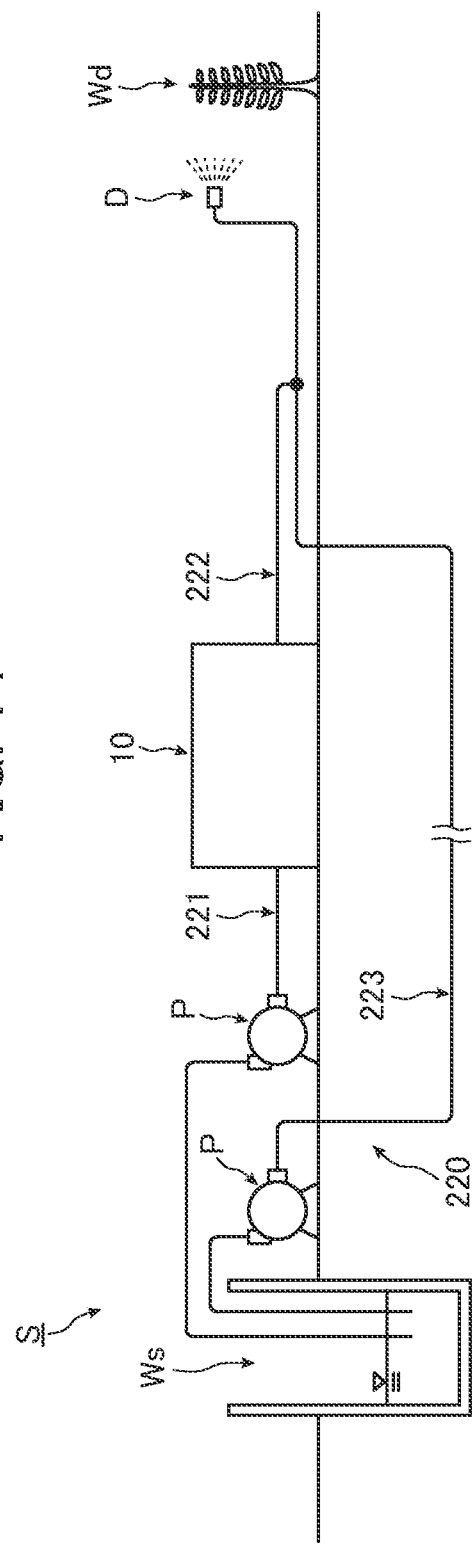

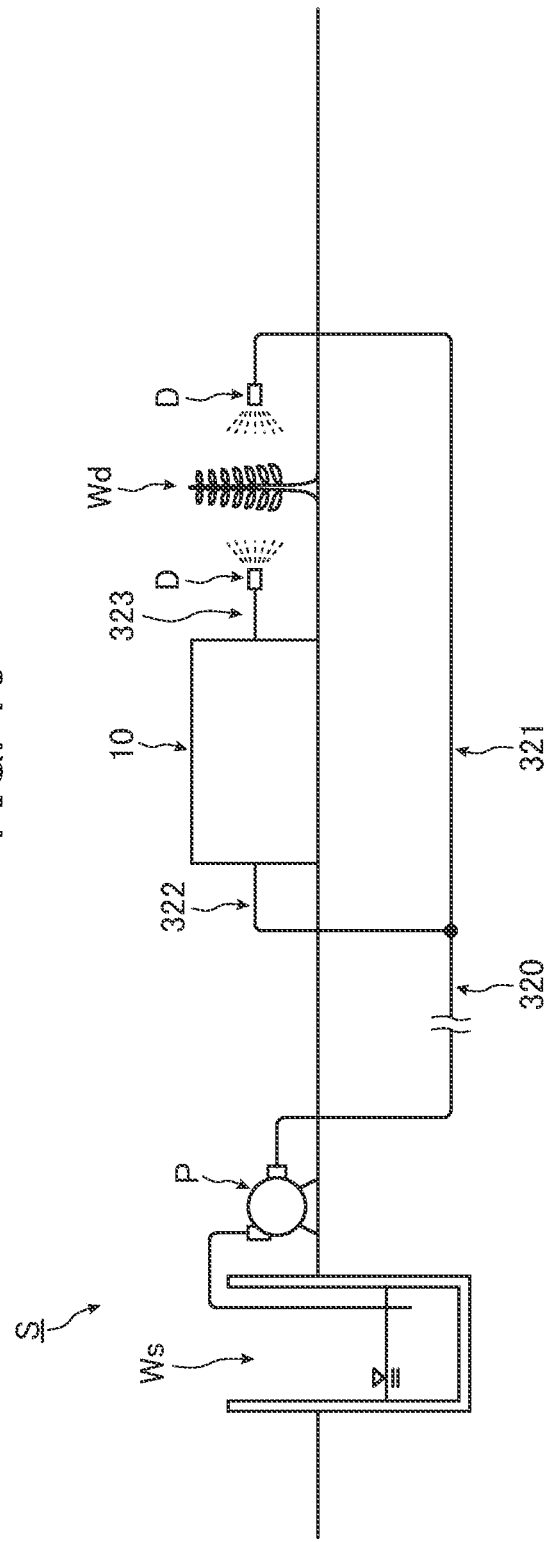

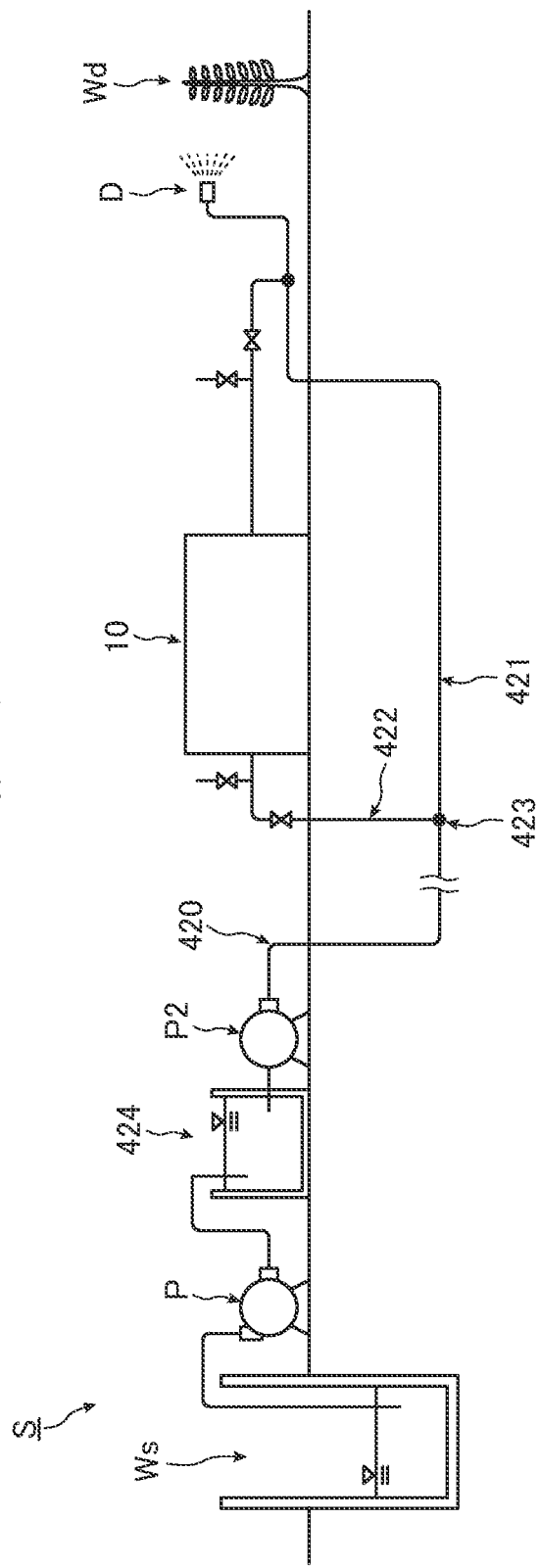

LIQUID SUPPLY APPARATUS

CROSS REFERENCE TO RELATED APPLICATIONS

This application is the U.S. National Phase under 35 U.S.C. § 371 of International Application No. PCT/JP2019/021242, filed on May 29, 2019, which claims the benefit of Japanese Application No. 2018-103008, filed on May 30, 2018 and Japanese Application No. 2018-241196, filed on Dec. 25, 2018, the entire contents of each are hereby incorporated by reference.

TECHNICAL FIELD

The present invention relates to a liquid supply facility, particularly to a liquid supply facility having a flow path through which liquid supplied from a liquid supply source flows and an ultrafine bubble generating apparatus that generates ultrafine bubbles in liquid.

BACKGROUND ART

At present, liquid containing ultrafine bubbles such as nanobubbles is used in various fields, e.g., agricultural and water treatment fields. To use ultrafine bubble-containing liquid, an ultrafine bubble generating apparatus generating ultrafine bubbles in liquid is necessary.

Among ultrafine bubble generating apparatuses, some apparatuses generate ultrafine bubbles in liquid based on the principle of pressurized dissolution. To generate ultrafine bubbles in liquid based on the principle of pressurized dissolution, gas needs to be dissolved in liquid. Typically, a conventional ultrafine bubble generating apparatus has a pump as a liquid discharger and sucks in gas along with liquid on the intake side of the pump or inside the pump to thereby incorporate the gas into the liquid (for instance, see Patent Literatures 1 and 2).

An ultrafine bubble generating apparatus described in Patent Literature 1 includes a return path for returning water discharged from a water path, and the return path is connected with, in sequence from the upstream side to the downstream side, a gas introduction portion, a pressurizing pump, a gas dissolution device and a discharge nozzle. In the gas introduction portion, carbon dioxide is incorporated, as bubbles, into water having entered the return path. After flowing out of the gas introduction portion, the bubble-containing water is pressurized by the pressurizing pump and pressure-fed to the gas dissolution device. In the gas dissolution device, the dissolution of carbon dioxide into the water is accelerated. The water flown out of the gas dissolution device (carbon dioxide-dissolved water) enters the discharge nozzle and passes a decompression mechanism in the nozzle to be decompressed. In this process, carbon dioxide dissolved in water appears as ultrafine bubbles, and therefore, ultrafine bubble-containing water containing ultrafine bubbles of carbon dioxide is generated.

Micro-nanobubble generating system described in Patent Literature 2 includes a bellows cylinder pump, a gas and liquid mixing tank and a micro-nanobubble generating nozzle. The bellows cylinder pump is connected with a liquid suction pipe, and a gas suction regulating valve having a gas suction port is attached to the pump. The bellows cylinder pump sucks in a mixture of liquid having flown through the liquid suction pipe and gas whose flow rate has been regulated by the gas suction regulating valve, stirs the mixture in its bellows, and compresses the mixture to dissolve the gas in the liquid. The bellows cylinder pump pressure-feeds the liquid and the gas to the gas and liquid mixing tank. The liquid and the gas having entered the gas and liquid mixing tank are mixed, and after the gas is dissolved in the liquid, transported to the micro-nanobubble generating nozzle. Once the gas-dissolved liquid passes the inside of the nozzle, micro-nanobubbles are generated in the gas-dissolved liquid.

CITATION LIST

Patent Literature

Patent Literature 1: JP 2014-161241 A
Patent Literature 2: JP 2013-166143 A

SUMMARY OF INVENTION

Technical Problems

Meanwhile, to supply ultrafine bubble-containing liquid, a liquid supply source and a flow path through which liquid supplied from the liquid supply source flows are necessary in addition to the ultrafine bubble generating apparatus above. For the liquid supply source, when the liquid is water, for instance, wells, rivers, lakes, dams, water treatment plants of tap water, and the like are applicable. The flow path is constituted of piping or the like and installed to extend from a liquid supply source toward a liquid destination.

Many conventional ultrafine bubble generating apparatuses are configured to, for instance, take in liquid from a storage tank storing the liquid having flown through a flow path, and discharge the liquid from a liquid discharger, for various reasons.

However, if an ultrafine bubble generating apparatus is configured such that its liquid discharger takes in liquid directly from a flow path, ultrafine bubbles can be directly generated in liquid supplied from a liquid supply source. In this case, compared to the configuration in which liquid is taken in from a storage tank, it is easier to ensure a higher flow rate of ultrafine bubble-containing liquid.

In the meantime, when a liquid discharger takes in liquid directly from a flow path, the pressure of the liquid entering the liquid discharger from the upstream side of the liquid discharger in the flow path is positive. Now such a condition is described with one example. In the case where water drawn from a well is pressure-fed by, for instance, a pump to flow through a flow path, when the flow path is connected to a liquid intake port of a liquid discharger, the pressure of the water at the intake port is positive (in other words, does not become negative). Under the condition as above, it is difficult to suck in gas on the intake port side of the liquid discharger and inside the liquid discharger as in Patent Literatures 1 and 2, and accordingly, it is difficult to incorporate gas into liquid by the above-described methods.

The present invention has been made in view of the above circumstances and an object of the invention is to provide a liquid supply facility capable of taking in liquid directly from a flow path and properly incorporating gas into the liquid when ultrafine bubbles are generated in the liquid using an ultrafine bubble generating apparatus.

Solution to Problems

In order to attain the foregoing object, the present invention provides a liquid supply facility comprising: a flow path through which liquid supplied from a supply source of liquid flows; and an ultrafine bubble generating apparatus generating ultrafine bubbles in liquid, wherein the ultrafine bubble generating apparatus includes: a liquid discharger discharging liquid taken in from the flow path; a gas incorporating device pressurizing gas and incorporating the gas into liquid discharged from the liquid discharger; and an ultrafine bubble generator generating ultrafine bubbles in liquid by allowing liquid having gas incorporated therein to pass through an inside of the ultrafine bubble generator, wherein a pressure of liquid entering the liquid discharger from an upstream side of the liquid discharger in the flow path is positive, and wherein, between the liquid discharger and the ultrafine bubble generator, the gas incorporating device pressurizes gas and incorporates the gas into liquid being in a pressurized state and flowing toward the ultrafine bubble generator.

In the thus-configured liquid supply facility of the invention, the liquid discharger takes in liquid directly from the flow path and discharges the taken liquid. In this case, the pressure of liquid entering the liquid discharger from the upstream side of the liquid discharger is positive. In addition, on the downstream side of the liquid discharger, the gas incorporating device pressurizes gas and incorporates the gas into liquid flowing in a pressurized state. Owing to this, even when the pressure of liquid entering the liquid discharger from the upstream side of the liquid discharger is positive, it is possible to properly incorporate gas into the liquid.

In the liquid supply facility as above, preferably, the flow path is branched into a plurality of flow paths at its intermediate point, and the liquid discharger takes in liquid from one of the plurality of flow paths.

In this configuration, the flow path is branched to separate a flow path extending toward the ultrafine bubble generating apparatus from other paths (i.e., paths not passing the ultrafine bubble generating apparatus). This makes it possible to separately utilize a plurality of branch flow paths depending on the application of liquid flowing therethrough.

In the liquid supply facility as above, preferably, ultrafine bubble-containing liquid is ejected from a tip part of the ultrafine bubble generator, and the tip part of the ultrafine bubble generator is connected to the flow path on a downstream side of the liquid discharger.

This configuration makes it possible to supply ultrafine bubble-containing liquid generated by the ultrafine bubble generating apparatus into the flow path and deliver the ultrafine bubble-containing liquid to the liquid destination through the flow path.

In the liquid supply facility as above, preferably, ultrafine bubble-containing liquid is ejected from a tip part of the ultrafine bubble generator, the flow path is branched at its intermediate point into a plurality of flow paths including a first flow path and a second flow path, the liquid discharger takes in liquid from the second flow path, and the tip part of the ultrafine bubble generator is connected to the first flow path on a downstream side of a branch point where the flow path is branched.

This configuration makes it possible to take in liquid having flown through the second flow path, generate ultrafine bubbles in the taken liquid, supply ultrafine bubble-containing liquid into the first flow path, and deliver the ultrafine bubble-containing liquid to the liquid destination through the first flow path.

In the liquid supply facility as above, more preferably, the second flow path is provided with at least one of a liquid flow rate regulating valve for regulating a flow rate of liquid flowing through the second flow path and a pressure reducing valve reducing a pressure of liquid flowing through the second flow path.

With this configuration, by operating the liquid flow rate regulating valve or the pressure reducing valve, the pressure of liquid on the downstream side of the ultrafine bubble generating apparatus can be regulated to suitably balance with the pressures at various points in the flow path.

In the liquid supply facility as above, preferably, a pressure of gas pressurized and incorporated into liquid by the gas incorporating device is higher than a pressure of liquid passing a position where gas is incorporated by the gas incorporating device.

With this configuration, gas can be more reliably incorporated into liquid on the downstream side of the liquid discharger.

In the liquid supply facility as above, preferably, a pressure of ultrafine bubble-containing liquid ejected from the tip part of the ultrafine bubble generator at a connection point where the tip part of the ultrafine bubble generator is connected to the flow path is higher than a pressure of liquid in the flow path at the connection point.

In this configuration, at the connection point, the pressure of ultrafine bubble-containing liquid is higher than the pressure of liquid in the flow path. Since ultrafine bubble-containing liquid is supplied into the flow path using the difference between the above pressures, ultrafine bubble-containing liquid can be delivered to the liquid destination through the flow path.

In the liquid supply facility as above, more preferably, Pa, Pb and ΔPb satisfy a relational expression (1):

$$Pb-\Delta Pb > Pa \qquad (1)$$

where a pressure of liquid in the flow path at the connection point is denoted by Pa, a discharge pressure at a time when the liquid discharger discharges liquid is denoted by Pb, and a pressure loss generated while liquid discharged from the liquid discharger passes the ultrafine bubble generator to turn into ultrafine bubble-containing liquid and flows up to the connection point is denoted by ΔPb.

Owing to this configuration, to supply ultrafine bubble-containing liquid into the flow path, the discharge pressure Pb of the liquid discharger can be appropriately set based on the pressure Pa of liquid in the flow path at the connection point and the pressure loss ΔPb generated between the liquid discharger and the connection point.

In the liquid supply facility, preferably, the liquid supply facility includes a communication portion allowing communication between the tip part of the ultrafine bubble generator and the first flow path, the tip part of the ultrafine bubble generator is connected to the first flow path via the communication portion, the communication portion is provided with a first liquid drainage line for draining liquid from the communication portion, and the second flow path is provided with a second liquid drainage line for draining liquid from the second flow path.

With this configuration, it is possible to drain liquid from each of the communication portion and the second flow path. For instance, when the ultrafine bubble generating apparatus will not be operated for a long time, it is possible to drain water accumulated in the communication portion and the second flow path.

In the liquid supply facility as above, preferably, the liquid discharger is a non-self-priming pump, the first liquid drainage line is provided with a first liquid drainage line switch valve that switches between opening and closing of the first liquid drainage line, the second liquid drainage line is provided with a second liquid drainage line switch valve that switches between opening and closing of the second liquid drainage line, and a communication portion switch valve that switches between opening and closing of the communication portion is provided in the communication portion on a downstream side of the first liquid drainage line.

With this configuration, when the liquid discharger that is a non-self-priming pump is activated, the pump can be easily primed by operating the respective switch valves.

In the liquid supply facility as above, liquid supplied from the supply source by use of a pressure-feeding device that pressure-feeds liquid may flow in a pressurized state through the flow path.

With this configuration, since pressurized liquid enters the liquid discharger from the upstream side of the liquid discharger, it is further difficult to incorporate gas into the liquid on the upstream side of the liquid discharger. In this case, the configuration of the invention, that is, the configuration in which gas is pressurized and incorporated into liquid on the downstream side of the liquid discharger is more advantageous.

In the liquid supply facility as above, preferably, the liquid supply facility includes a power generating apparatus generating electric power from renewable energy, and the ultrafine bubble generating apparatus operates using electric power generated by the power generating apparatus.

In connection with the above configuration, more preferably, the ultrafine bubble generating apparatus and the power generating apparatus are installed in a site having no power transmission facility transmitting electric power of a commercial power source.

With this configuration, the ultrafine bubble generating apparatus can be operated even in sites where no commercial power source is available, and thus, ultrafine bubble-containing liquid can be utilized even in such sites. When the pressure-feeding device is used in the above site, the pressure-feeding device can also be operated using electric power generated by the power generating apparatus.

In the liquid supply facility as above, preferably, a storage tank for storing liquid is provided at an intermediate position of the flow path, and the liquid discharger takes in, from the flow path, liquid having been stored in the storage tank and then flown out of the storage tank and discharges liquid.

In this configuration, liquid flowing through the flow path is stored in the storage tank once and then again flows through the flow path toward the ultrafine bubble generating apparatus. This makes it possible to clarify liquid to be supplied to the ultrafine bubble generating apparatus (for instance, settle suspended matter and trash in the liquid) in the storage tank and regulate the liquid temperature in the storage tank.

In the liquid supply facility as above, preferably, the liquid is water.

With this configuration, it is possible to generate ultrafine bubbles in water, in other words, supply ultrafine bubble-containing water.

Advantageous Effects of Invention

According to the present invention, it is possible to take in liquid directly from a flow path and properly incorporate gas into the liquid when ultrafine bubbles are generated in the liquid using an ultrafine bubble generating apparatus.

BRIEF DESCRIPTION OF DRAWINGS

FIG. 13 is a schematic view showing a liquid supply facility according to a first modification.

FIG. 14 is a schematic view showing a liquid supply facility according to a second modification.

FIG. 15 is a schematic view showing a liquid supply facility according to a third modification.

FIG. 16 is a schematic view showing a liquid supply facility according to a fourth modification.

DESCRIPTION OF EMBODIMENTS

Figure 1:
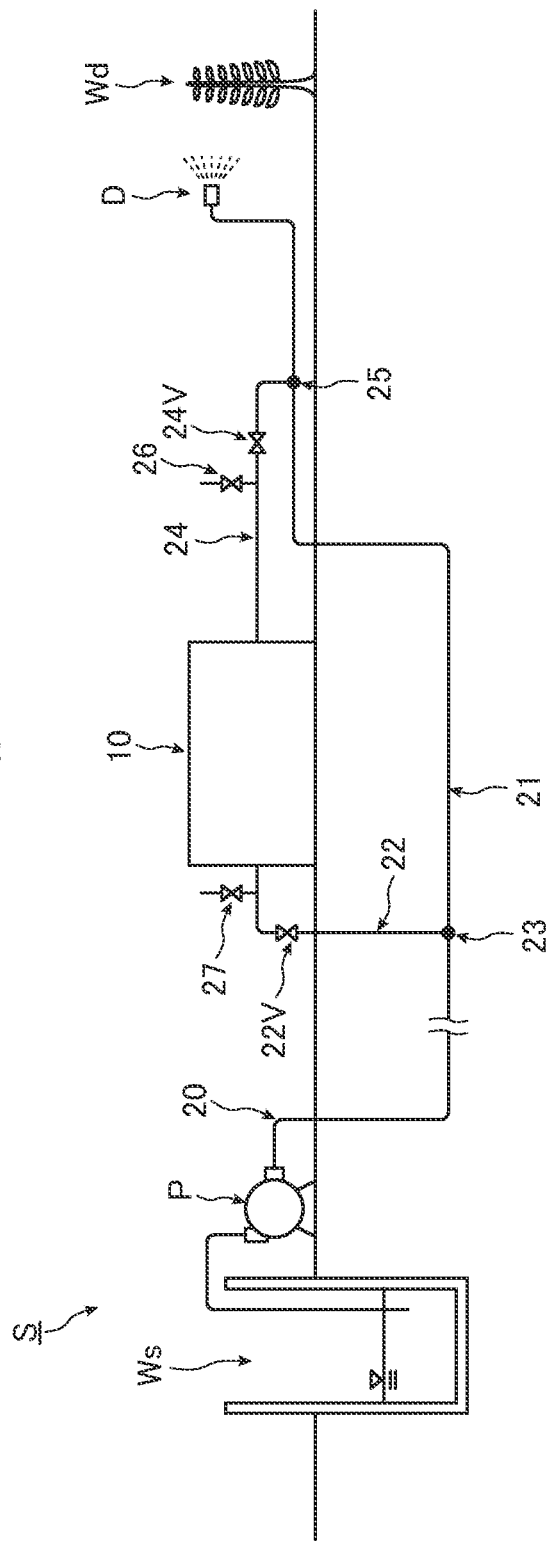
FIG. 1 is a schematic view showing a liquid supply facility according to an embodiment of the invention.

A liquid supply facility of the invention is described below by reference to a preferred embodiment (hereinafter called the embodiment) illustrated in the appended drawings.

Note that the embodiment is one specific embodiment used to describe the invention in an obvious manner, and the invention is by no means limited to the embodiment. In other words, the invention may be modified or improved without departing from the scope and spirit of the invention, and needless to say, the invention includes its equivalents.

The embodiment is described taking water used for the purposes of agriculture or plant cultivation (including horticulture and home vegetable gardening) as an example of liquid. However, the invention is not limited thereto, and the liquid supply facility of the invention may be utilized even in cases of supplying water for other purposes than agriculture and plant cultivation, for instance, supplying industrial water, daily life water and water for use in other economic activities. Further, it is possible to use the liquid supply facility of the invention also in cases of supplying other liquids than water, as exemplified by chemical solutions, liquid fertilizers, oils, alcohols, organic solvents, and dispersion solutions such as emulsions.

In the embodiment, water is general water (e.g., tap water, well water, river water or the like) used for the purpose of agriculture or plant cultivation; however, the invention is not limited thereto, and use may be made of distilled water, pure water or ultrapure water, an aqueous solution containing a solid or gaseous substance dissolved therein, turbid water containing a crystalline body, a mineral, an organic substance or the like mixed therein, or a mixed water in which water is mixed with another liquid substance (e.g., a liquid medical agent or fertilizer).

Water used for the purpose of agriculture or plant cultivation may be used for soil culture (including nutrient-solution soil culture or soil culture with fertigation), hydroponic culture, or nutrient solution culture.

In this description, the term "apparatus" comprises an apparatus that may be treated as a unit with its components being stored in a casing, and also comprises, without limitation, an apparatus with its components being disposed separately in an independent manner but regarded as one unit because the components cooperate together to achieve a specific objective.

In this description, the terms "upstream side" and "downstream side" are concepts used to indicate a position defined in a direction in which water flows (more precisely, a position viewed from a reference position or member), and the side closer to a water supply source is the "upstream side," whilst the side farther from the water supply source is the "downstream side."

In this description, the expression "connected" includes connection by means of a joint, welding or other means, and also includes, without limitation, connection via a valve, a hose, a connecting pipe or the like.

<<General Outline of Liquid Supply Facility>>

First, the general outline of a liquid supply facility according to the embodiment (hereinafter referred to as a liquid supply facility S) is described by reference to FIG. 1. FIG. 1 is a schematic view showing the configuration of the liquid supply facility S.

The liquid supply facility S is a facility supplying water to a water destination Ws, and includes, as its main constituent components, a flow path 20 through which water supplied from a water supply source Ws flows and an ultrafine bubble generating apparatus 10 generating ultrafine bubbles in water, as shown in FIG. 1. The ultrafine bubble generating apparatus 10 is capable of generating nanobubbles as ultrafine bubbles in water. Nanobubble-containing water is supplied for growing plants such as crops, for example, and is sprinkled or sprayed to soil in a farm or an agricultural field that is the water destination Wd.

Nanobubbles are ultrafine bubbles with a diameter of less than 1 µm, and the state where nanobubbles are contained in water may be maintained for a long time (about several months). Nanobubbles are different from microbubbles representing bubbles with a diameter of not less than 1 µm and not more than 1 mm. Nanobubble-containing water is known for its effects such as promotion of growth of plants supplied with this water.

The flow path 20 is described by reference to FIG. 1. The flow path 20 is a flow path through which water supplied from the water supply source Ws flows, and is constituted of a pipe (a steel pipe or a polyvinyl chloride pipe) installed to extend toward the water destination Wd (a farm or an agricultural field). A part of the pipe may be constituted of a centrifugal reinforced concrete pipe and embedded underground as shown in FIG. 1. The supply source Ws is a well when water is groundwater (well water), is a dam, a river, a lake or the like when water is surface water, and is a water treatment plant or the like when water is tap water. FIG. 1 and FIGS. 13 to 16 to be described later show the cases where the supply source Ws is a well.

In the flow path 20, water flows with its pressure being positive. To be more specific, in the embodiment, water is supplied from the supply source Ws by use of a pressure-feeding device P that pressure-feeds water, such as a pump, as shown in FIG. 1. Accordingly, water in a pressurized state passes through various sections of the flow path 20 (i.e., with its pressure being positive in various sections of the flow path 20).

The method of supplying water from the supply source Ws is not limited to the method using the pressure-feeding device P as in the embodiment, and water may be supplied from the supply source Ws using a height difference (fall) between the water supply source Ws and the water destination Wd or using the pressure-feeding device P and the height difference between the supply source Ws and the destination Wd in combination.

When water is supplied from a river, a reservoir and a water source of agricultural water serving as the supply source Ws by use of the pressure-feeding device P, a strainer or a filter for catching trash and a siphonage prevention valve are preferably provided between the pressure-feeding device P and the ultrafine bubble generating apparatus 10 in the flow path 20, as needed. A flow switch may also be provided in the flow path 20 to monitor the flow of liquid in the flow path 20 and prevent idling of the pressure-feeding device P.

In the embodiment, the flow path 20 is branched into a plurality of flow paths at its intermediate point, specifically branched into a first flow path 21 and a second flow path 22 at a branch point 23 shown in FIG. 1. The first flow path 21 extends toward a farm or an agricultural field that is the water destination Wd, and the terminus thereof is joined to a water sprinkling device D installed in the farm or the agricultural field.

The method of sprinkling water in the destination Wd is not particularly limited. Water may be supplied directly to crops and plants, sprinkled to the ground surface, or injected from an irrigation tube or a drip tube to the ground surface; alternatively, drip irrigation may be carried out to allow water to ooze out of a tube embedded in soil.

The second flow path 22 extends toward the ultrafine bubble generating apparatus 10, and the terminus thereof is connected to a liquid discharger 30 included in the ultrafine bubble generating apparatus 10. In other words, the ultrafine bubble generating apparatus 10 takes in water flowing through the second flow path 22 and generates nanobubbles in the taken water. Then, nanobubble-containing water is returned to the first flow path 21, mixed with water flowing through the first flow path 21 (more precisely, nanobubble-free water), and delivered to the water sprinkling device D through the first flow path 21.

As shown in FIG. 1, the second flow path 22 is provided with a water flow rate regulating valve 22V for regulating the flow rate of water flowing through the second flow path 22. The water flow rate regulating valve 22V corresponds to a liquid flow rate regulating valve and is constituted of a cock valve of manually openable and closable type. When the water flow rate regulating valve 22V is open, water is introduced into the ultrafine bubble generating apparatus 10, and when the water flow rate regulating valve 22V is closed, the transport of water to the ultrafine bubble generating apparatus 10 is interrupted. Therefore, during a non-operating period of the ultrafine bubble generating apparatus 10 (i.e., when nanobubble-containing water is not used), the water flow rate regulating valve 22V is closed so that only nanobubble-free water can be delivered to the destination Wd.

Whilst the water flow rate regulating valve 22V that is the liquid flow rate regulating valve is provided in the second flow path 22 in the embodiment, a pressure reducing valve may be provided in place of or along with the water flow rate regulating valve 22. The pressure reducing valve is provided to reduce the pressure of water (liquid) flowing through the second flow path 22. The provision of at least one of the water flow rate regulating valve 22V and the pressure reducing valve makes it possible to regulate the discharge pressure of the liquid discharger 30, which will be described later, and the pressure of water at an intake port 31 of the liquid discharger 30. Thus, the regulation is carried out such that pressure of water (more precisely, nanobubble-containing water) on a downstream side of the ultrafine bubble generating apparatus 10 balances with pressure at various points in the flow path 20.

Whilst the flow path 20 is branched into two flow paths (i.e., the first flow path 21 and the second flow path 22) in the embodiment, the number of branch flow paths is not particularly limited as long as the flow path is branched into plural flow paths.

As described above, the ultrafine bubble generating apparatus 10 according to the embodiment takes in water directly from the flow path 20, generates nanobubbles in the taken water, and delivers the nanobubble-containing water to the destination Wd through the flow path 20. When this configuration is employed, it is possible to deliver nanobubble-containing water to the destination Wd using an existing flow path extending up to the destination Wd by joining the existing flow path to the ultrafine bubble generating apparatus 10.

Since the ultrafine bubble generating apparatus 10 takes in water directly from the flow path 20, it is possible to supply nanobubble-containing water at a relatively high flow rate. Furthermore, in the embodiment, whilst the ultrafine bubble generating apparatus 10 has a relatively compact structure, nanobubbles can be generated at high concentration in water. Specifically, for instance, many conventional ultrafine bubble generating apparatuses are configured to take in liquid from a storage tank that temporarily stores the liquid having flown through a flow path, for various reasons. Therefore, a larger space is needed for equipment installation because of the installation of the storage tank. In contrast, in the embodiment, since the ultrafine bubble generating apparatus 10 takes in water directly from the flow path 20, such a storage tank is not necessary, and an equipment installation space can be reduced accordingly.

<<Configuration of Ultrafine Bubble Generating Apparatus>>

Figure 2:
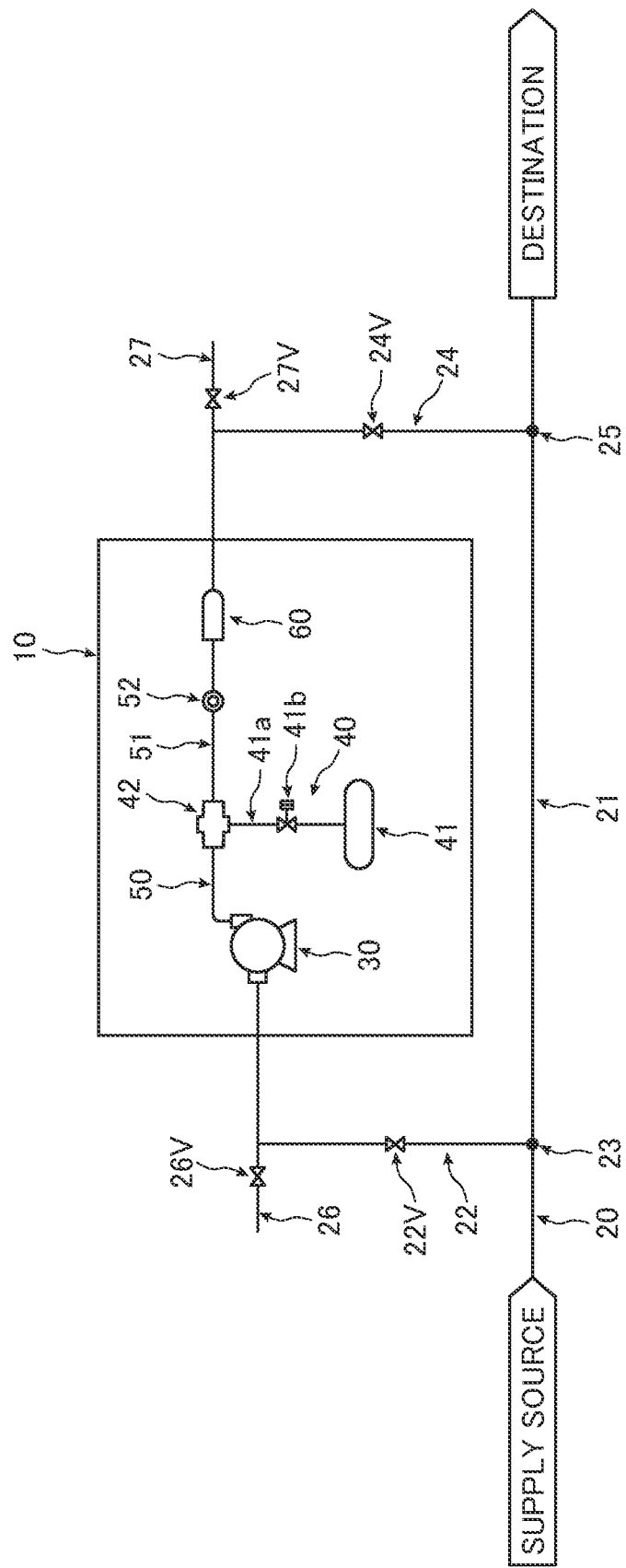
FIG. 2 is a schematic view showing an exemplary configuration of an ultrafine bubble generating apparatus included in the liquid supply facility.

Next, the configuration of the ultrafine bubble generating apparatus 10 is described by reference to FIG. 2. FIG. 2 is a schematic view showing the configuration of the ultrafine bubble generating apparatus 10.

The ultrafine bubble generating apparatus 10 includes, from the upstream side, the liquid discharger 30, a gas incorporating device 40, a sight glass 52, and an ultrafine bubble generating nozzle 60 serving as an ultrafine bubble generator. Those constituent devices are separately described below.

(Liquid Discharger 30)

The liquid discharger 30 is a device that takes in water which is liquid and that discharges the taken water. The liquid discharger 30 according to the embodiment is constituted of a pump, and pressurizes (increases pressure of) taken water and discharges the pressurized water at a discharge rate within a specified range.

Figure 3:
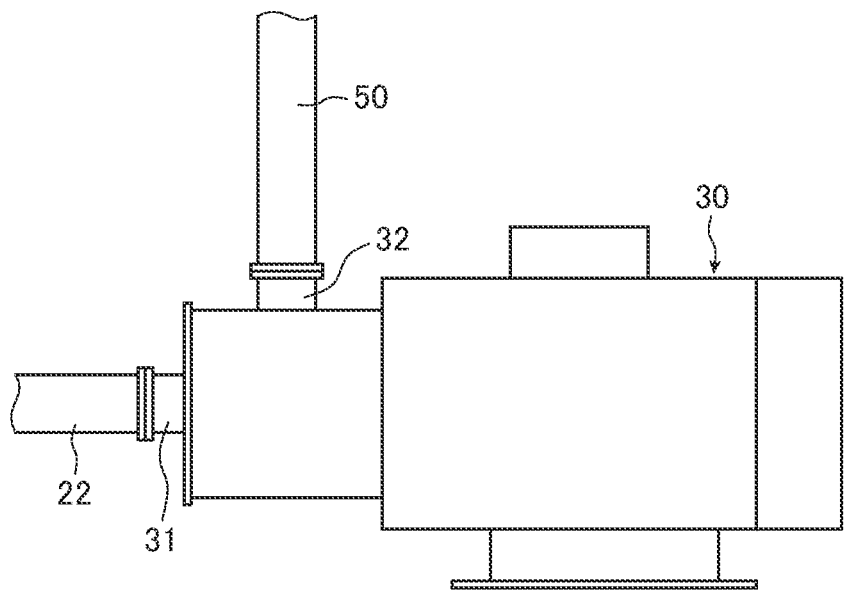
FIG. 3 is a schematic side view of a liquid discharger.

The liquid discharger 30 takes in water from one of a plurality of flow paths branched at the branch point 23. Specifically, the liquid discharger 30 includes the intake port 31 and a discharge port 32 for water, and the intake port 31 is connected with the second flow path 22 branched from the flow path 20. More specifically, as shown in FIG. 3, flanges are provided separately at the periphery of the terminus of the second flow path 22 and the periphery of the intake port 31. The second flow path 22 and the intake port 31 are joined together by joining the flanges to each other. FIG. 3 is a schematic side view of the liquid discharger 30 and shows the joint structure between the second flow path 22 and the intake port 31.

The liquid discharger 30 is to take in water from the second flow path 22 with pressure of water at the intake port 31 being positive. The pressure of water at the intake port 31 herein refers to the pressure of liquid entering the intake port 31 of the liquid discharger 30 from the upstream side of the liquid discharger 30 in the flow path 20 (more precisely, the second flow path 22). Although pulsating, the pressure of water at the intake port 31 remains substantially constant while the liquid discharger 30 is in operation. For instance, a known pressure gauge or compound gauge is disposed at a suitable position (specifically, a position at the same height as the intake port 31) in the vicinity of the intake port 31, and the pressure of water at the intake port 31 is measured by reading a value indicated by the gauge.

The discharge port 32 is connected with a pressurized water transport line 50 through which water discharged from the liquid discharger 30 flows. More specifically, as shown in FIG. 3, flanges are provided separately at the periphery of the upstream-side end of the pressurized water transport line 50 and the periphery of the discharge port 32. The pressurized water transport line 50 and the discharge port 32 are joined together by joining the flanges to each other.

For the machine type of the liquid discharger 30 used in the ultrafine bubble generating apparatus 10, a proper machine type is selected depending on a necessary flow rate of water and a pressure required to allow water to pass through a predetermined portion in the ultrafine bubble generating apparatus 10 at that flow rate. Specifically, a necessary amount (flow rate) of water discharged from the liquid discharger 30 is set, and a necessary value of pressure of water required to allow water to pass through a liquid passing portion 43 to be described later at that flow rate is obtained.

Figure 4:
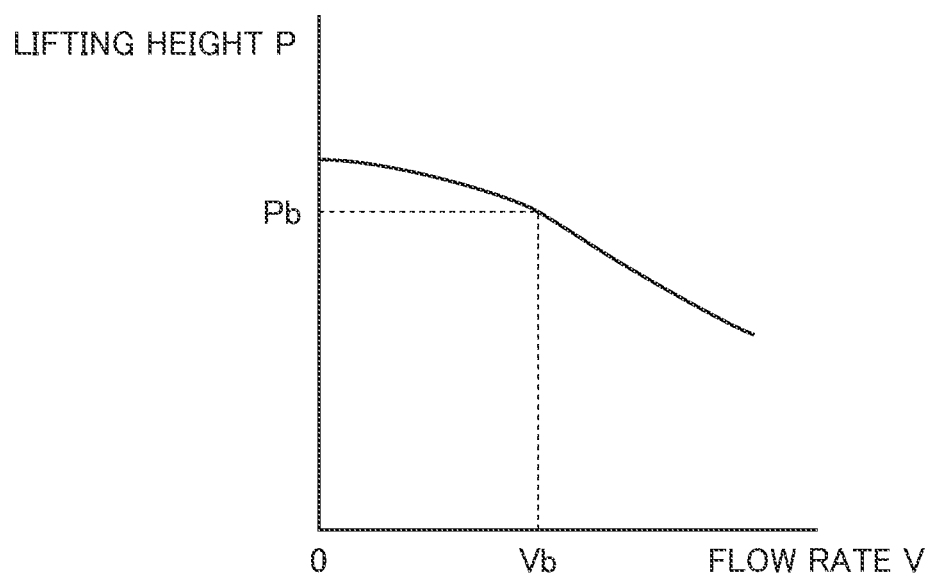
FIG. 4 is a view showing a performance curve of the liquid discharger.

Further, a discharge pressure (lifting height) when the liquid discharger 30 discharges water is set to a suitable range such that the necessary value (pressure value) above is satisfied. Then, based on the necessary flow rate of water and the set range of the discharge pressure, a machine type exhibiting a performance curve that can satisfy the flow rate and the range is selected. Specifically, with a discharge flow rate of water being defined as Vb, a discharge pressure Pb corresponding to the discharge flow rate Vb is obtained from the performance curve shown in FIG. 4, and when this discharge pressure Pb falls within a set range, a machine type exhibiting this performance curve is to be selected as the liquid discharger 30 for the ultrafine bubble generating apparatus 10. FIG. 4 is a view showing an example of the performance curve of the liquid discharger 30, where the horizontal axis represents the discharge flow rate and the vertical axis represents the discharge pressure (i.e., lifting height).

Examples of the machine type selected according to the foregoing procedures include a horizontal multistage centrifugal pump manufactured by Grundfos and a vane pump manufactured by Tohshin Technical Co., Ltd.

For the machine type of the liquid discharger 30, it is preferable to select a machine type making minimum operation noise for the purpose of suppressing noise at the site where the ultrafine bubble generating apparatus 10 is used.

In the embodiment, the operation of the liquid discharger 30 is automatically controlled by a controlling device which is not shown. For instance, the controlling device controls on and off of the liquid discharger 30 using a timer or controls the same in response to supply of water from the supply source Ws. However, the invention is not limited thereto, and on and off of the liquid discharger 30 may be manually switched.

The liquid discharger 30 according to the embodiment is a non-self-priming pump having no self-priming ability. This means that when the liquid discharger 30 is activated, a process of filling the pump with water (i.e., priming) is required at the start of transport of water. In the embodiment, since the flow path 20 (more precisely, the second flow path 22) is directly connected to the intake port 31 of the liquid discharger 30, once the flow path 20 is opened, water flowing through the flow path 20 automatically enters the liquid discharger 30. Therefore, in the embodiment, the liquid discharger 30 that is a non-self-priming pump can be primed in a relatively easy and quick manner.

The liquid discharger 30 is not limited to a non-self-priming pump and may be a self-priming pump having a self-priming ability.

Whilst the liquid discharger 30 is constituted of a pump in the embodiment, the invention is not limited thereto, any device may be employed as long as it takes in and discharges liquid, and other devices than a pump are also applicable.

In the embodiment, the intake port 31 is provided in the liquid discharger 30, and the second flow path 22 is connected to the intake port 31. However, the invention is not limited thereto, and there may be used a configuration in which the intake port 31 is not connected to the flow path 20, for instance, a configuration in which the intake port 31 is inserted in the flow path 20. Alternatively, there may be used a configuration in which the flow path 20 is integral with the liquid discharger 30 (that is, a configuration in which the liquid discharger 30 has no intake port 31 and the flow path 20 is inseparable from the liquid discharger 30). Still alternatively, there may be used a configuration in which the intake port 31 is disposed immediately under and away from an opening (water outlet) formed in the flow path 20 (that is, a configuration in which water falling from the water outlet can be taken in through the intake port 31 although the intake port 31 and the flow path 20 are separated from each other).

(Gas Incorporating Device 40)

The gas incorporating device 40 is a device that pressurizes gas and incorporates the gas into water discharged from the liquid discharger 30. More specifically, the gas incorporating device 40 pressurizes gas and incorporates the gas into water being in the pressurized state and flowing toward the ultrafine bubble generating nozzle 60, between the liquid discharger 30 and the ultrafine bubble generating nozzle 60. Here, the pressurized state of water is generated due to a difference between the flow rate of water discharged from the liquid discharger 30 and that of water (more precisely, ultrafine bubble-containing water) ejected from the ultrafine bubble generating nozzle 60. More specifically, in the embodiment, since the discharge flow rate of the liquid discharger 30 is higher than the flow rate of water ejected from the ultrafine bubble generating nozzle 60, the pressure of water is inevitably brought to a pressurized state between the liquid discharger 30 and the ultrafine bubble generating nozzle 60. The pressure of water flowing in the pressurized state is suitably determined according to the performance of the liquid discharger 30, the design dimensions of the ultrafine bubble generating nozzle 60, and other factors, and there is no particular limitation.

As shown in FIG. 2, the gas incorporating device 40 includes a pressurized gas generation source 41 that is a generation source of pressurized gas and a gas incorporating device body 42 that allows water and gas to pass therethrough. The pressurized gas generation source 41 is constituted of a pressure vessel filled with pressurized gas or a compressor compressing gas, and generates gas pressurized to a specified pressure. Examples of gas generated by the pressurized gas generation source 41 include air, oxygen, nitrogen, fluorine, carbon dioxide and ozone.

A gas transport line 41a constituted of a tube, a hose or a pipe extends from the pressurized gas generation source 41. The gas transport line 41a is joined to a gas passing portion 44 of the gas incorporating device body 42. A gas flow rate regulating valve 41b is provided at an intermediate point of the gas transport line 41a to regulate the flow rate of gas (hereinafter also called "gas flow rate") transported from the pressurized gas generation source 41 flowing through the gas transport line 41a. The opening of the gas flow rate regulating valve 41b is regulated in response to an opening/closing signal sent from a controlling device (not shown). In the embodiment, a flow rate regulating valve of needle valve type is used as the valve constituting the gas flow rate regulating valve 41b in order to set the gas flow rate to a quite low value.

The gas incorporating device body 42 is a cylindrical device whose upstream-side end is connected with the pressurized water transport line 50 extending from the discharge port 32 of the liquid discharger 30. A gas-incorporated water transport line 51 extends from the downstream-side end of the gas incorporating device body 42 toward the ultrafine bubble generating nozzle 60. The pressurized water transport line 50 and the gas-incorporated water transport line 51 are each constituted of a tube, a hose or a pipe.

Figure 5:
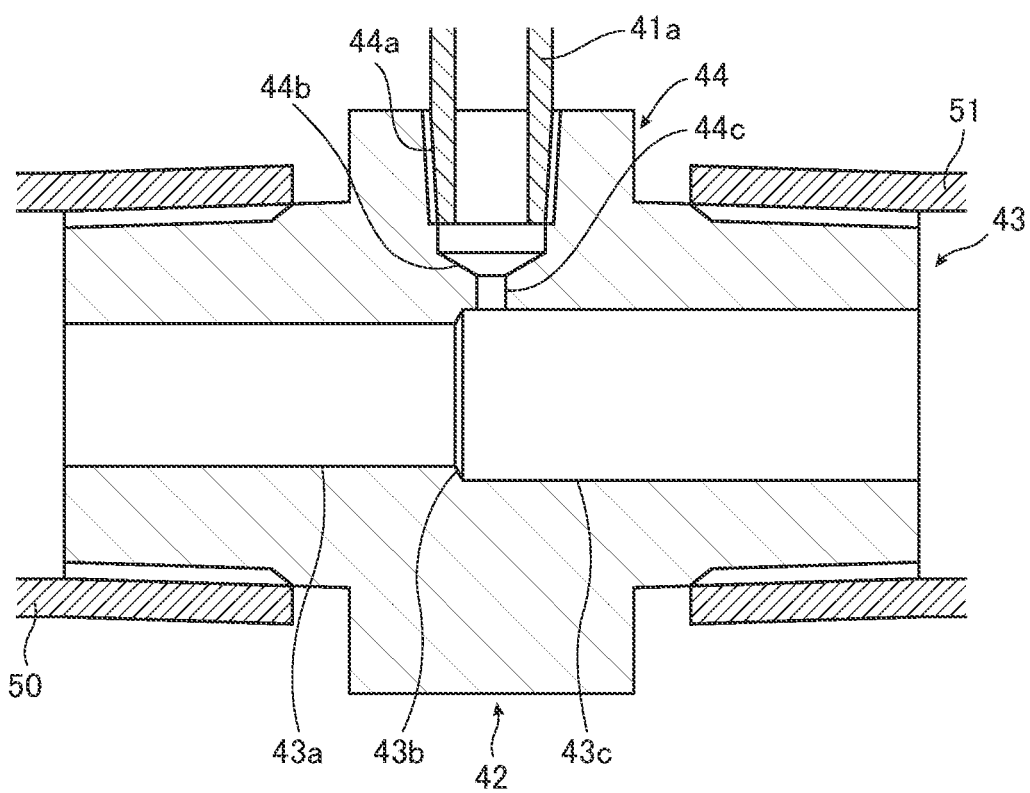
FIG. 5 is a cross-sectional side view of a gas incorporating device body.

The gas incorporating device body 42 is described by reference to FIG. 5. The gas incorporating device body 42 includes the liquid passing portion 43 through which water discharged from the liquid discharger 30 passes and the gas passing portion 44 through which pressurized gas generated from the pressurized gas generation source 41 passes. FIG. 5 is a cross-sectional side view of the gas incorporating device body 42.

The liquid passing portion 43 has a tubular shape, and water (more precisely, water discharged from the liquid discharger 30 and pressurized) passes through the inside of the liquid passing portion 43. As shown in FIG. 5, the interior of the liquid passing portion 43 is formed of three regions aligned along the same axis, and is divided into, from the upstream side, a first uniform diameter section 43a, a diameter increasing section 43b, and a second uniform diameter section 43c. The first uniform diameter section 43a is provided to introduce water into the gas incorporating device body 42 and as shown in FIG. 5, is connected with the pressurized water transport line 50. The inner diameter of the first uniform diameter section 43a is smaller than the bore diameter of the pressurized water transport line 50 and is, for example, reduced to about a quarter of the bore diameter. Accordingly, when water enters the first uniform diameter section 43a from the pressurized water transport line 50, water flows through the first uniform diameter section 43a toward the downstream side with its flow velocity (linear velocity) being accelerated.

Meanwhile, to flow water at a flow rate of 10 l/min, the inner diameters of the first uniform diameter section 43a and the second uniform diameter section 43c are preferably about 6 mm and about 8 mm, respectively; when the flow rate is changed, the inner diameters of the first uniform diameter section 43a and the second uniform diameter section 43c attaining the flow rate of 10 l/min may be appropriately changed in accordance with the changed flow rate.

The diameter increasing section 43b is continuous with the downstream-side end of the first uniform diameter section 43a and gradually increases in inner diameter toward the downstream side. When water enters the diameter increasing section 43b from the first uniform diameter section 43a, water flows through the diameter increasing section 43b toward the downstream side with a decreasing flow velocity (linear velocity). As shown in FIG. 5, the entire length (the length in the axial direction) of the diameter increasing section 43b is far smaller than that of the first uniform diameter section 43a and that of the second uniform diameter section 43c.

The second uniform diameter section 43c is continuous with the downstream-side end of the diameter increasing section 43b. As shown in FIG. 5, the downstream-side end of the second uniform diameter section 43c is connected with the gas-incorporated water transport line 51. Gas is incorporated into water while the water flows through the second uniform diameter section 43c. In other words, water having gas incorporated therein flows out of the second uniform diameter section 43c. The inner diameter of the second uniform diameter section 43c is larger than that of the first uniform diameter section 43a but smaller than the bore diameter of the pressurized water transport line 50 and is, for example, about a third of the bore diameter of the pressurized water transport line 50. Accordingly, water flows through the second uniform diameter section 43c at a further accelerated velocity compared to the time when it flows through the pressurized water transport line 50. In other words, water having gas incorporated therein flows through the second uniform diameter section 43c at a higher flow velocity than that of water flowing through the pressurized water transport line 50.

The gas passing portion 44 is a cylindrical projection that projects from the outer periphery of the liquid passing portion 43 toward the outside of the liquid passing portion 43 in the radial direction thereof. As shown in FIG. 5, the interior of the gas passing portion 44 is formed of three regions arranged in series and having different diameter sizes, and is divided into, from the outermost position in the radial direction of the liquid passing portion 43, a connection section 44a, a narrowed section 44b and an injection section 44c. As shown in FIG. 5, the connection section 44a receives the terminus of the gas transport line 41a therein and is thus joined to the gas transport line 41a. In other words, gas generated from the pressurized gas generation source 41 is transported through the gas transport line 41a and introduced into the connection section 44a of the gas passing portion 44.

The narrowed section 44b is continuous with an inner end part of the connection section 44a in the radial direction of the liquid passing portion 43 and has a diameter reducing toward the inside of the liquid passing portion 43 in the radial direction. Gas enters the narrowed section 44b, and when the gas passes through the narrowed section 44b, the flow rate thereof is reduced, so that the gas enters the injection section 44c at an extremely low flow rate.

The injection section 44c is continuous with an inner end part of the narrowed section 44b in the radial direction of the liquid passing portion 43 and extends up to a position where the injection section 44c is joined to the second uniform diameter section 43c of the liquid passing portion 43. More specifically, the injection section 44c is joined to the second uniform diameter section 43c at a position immediately downstream from the diameter increasing section 43b. That is, gas having entered the injection section 44c then enters the second uniform diameter section 43c of the liquid passing portion 43 through the injection section 44c.

Subsequently, gas having entered the second uniform diameter section 43c is incorporated into water flowing through the second uniform diameter section 43c. At this time, since gas is generated from the pressurized gas generation source 41, gas in the pressurized state enters the second uniform diameter section 43c. In other words, the gas incorporating device 40 pressurizes gas and introduces the pressurized gas into the second uniform diameter section 43c.

More specifically, water in the pressurized state flows through the second uniform diameter section 43c. That is, the pressure of water in the second uniform diameter section 43c is positive (in other words, does not become negative), and the pressure of water immediately after the water enters the second uniform diameter section 43c is slightly lower than the discharge pressure Pb at the time when the liquid discharger 30 discharges water.

In contrast, the pressure (hereinafter called "incorporation pressure Pi") when the gas incorporating device 40 pressurizes gas and incorporates the gas into water is set higher than the discharge pressure Pb. The incorporation pressure Pi corresponds to the pressure of pressurized gas generated from the pressurized gas generation source 41, specifically, the pressure of compressed gas charged in a pressure vessel or the pressure of gas immediately after compression by a compressor.

As described above, in the embodiment, the incorporation pressure Pi is higher than the discharge pressure Pb of water. Accordingly, the incorporation pressure Pi is higher than the pressure of water passing a position where gas is incorporated by the gas incorporating device 40 (i.e., the upstream-side end of the second uniform diameter section 43c). This allows gas to be pushed into water, which flows in the pressurized state, at the upstream-side end of the second uniform diameter section 43c. That is, the gas incorporating device 40 introduces gas pressurized to the extent that it exceeds the pressure of water at the upstream-side end of the second uniform diameter section 43c and thus incorporates gas into water passing the upstream-side end of the second uniform diameter section 43c against the pressure of the water.

Although pulsating, the incorporation pressure Pi and the pressure of water passing the upstream-side end of the second uniform diameter section 43c remain substantially constant while gas is incorporated into water. For instance, a known pressure gauge or compound gauge is disposed at a suitable position in each of the injection section 44c and the second uniform diameter section 43c, and the relevant pressure is measured by reading a value indicated by the gauge.

The incorporation pressure Pi is not limited to that higher than the discharge pressure Pb of water as long as it is higher than the pressure of water passing the upstream-side end of the second uniform diameter section 43c, and may be slightly lower than the discharge pressure Pb of water.

In the second uniform diameter section 43c, water flows at an accelerated velocity. Gas is introduced into the second uniform diameter section 43c after the flow rate thereof is reduced in the narrowed section 44b. Consequently, only a slight amount of gas enters the second uniform diameter section 43*c*, and the gas receives a shearing force from water flowing through the second uniform diameter section 43*c* at an accelerated velocity and is cut into fine pieces at the moment when the gas enters the second uniform diameter section 43*c*. As a result, gas in the form of fine bubbles is incorporated into the water.

Whilst the configuration of the gas incorporating device 40 according to the embodiment is described above, the configuration of the gas incorporating device 40 is not limited to the foregoing one as long as it is capable of pressurizing gas and incorporating the gas into water; for instance, there may be used the configuration in which a portion corresponding to the gas passing portion 44 is disposed inside the liquid passing portion 43 or the configuration in which the liquid passing portion 43 and the gas passing portion 44 are not separated but integral with each other.

Figure 6:
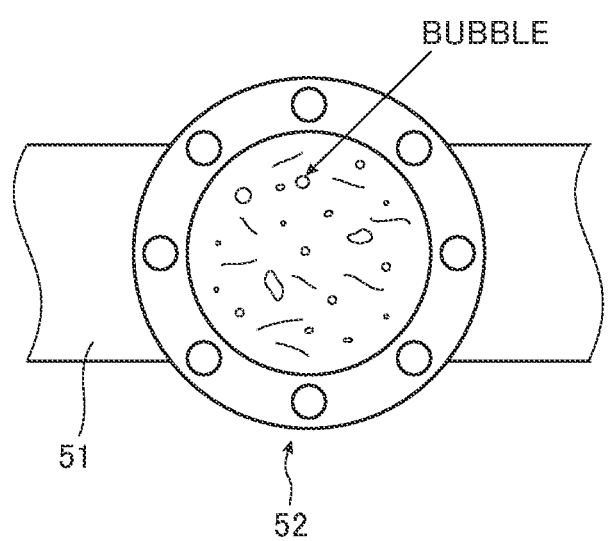
FIG. 6 is a view showing the appearance of a sight glass.

Further, as shown in FIG. 2, the sight glass 52 is provided at an intermediate position of the gas-incorporated water transport line 51, i.e., between the gas incorporating device 40 and the ultrafine bubble generating nozzle 60. The sight glass 52 is disposed to monitor the flow condition of liquid having gas incorporated therein (hereinafter called "gas-incorporated water"), specifically, to observe the degree of incorporation of gas in gas-incorporated water. As shown in FIG. 6, gas-incorporated water flows inside the sight glass 52. FIG. 6 is a view showing the appearance of the sight glass 52 and shows the state where gas-incorporated water flows inside the sight glass 52.

Since the sight glass 52 is provided on the downstream side of the gas incorporating device 40, the degree of incorporation of gas in gas-incorporated water (more simply, the size, the number and other properties of bubbles) can be visually observed, and the gas flow rate and the like can be properly readjusted by regulating the opening of the gas flow rate regulating valve 41*b* based on the visually observed condition.

Whilst the sight glass 52 is provided in the embodiment, the invention is not limited thereto, and a flowmeter may be installed in place of or along with the sight glass 52. The installation of the flowmeter allows visual observation of the flow rate of water flowing on the downstream side of the gas incorporating device 40 as the state of flow of gas-incorporated water.

(Ultrafine Bubble Generating Nozzle 60)

The ultrafine bubble generating nozzle 60 is a device that allows gas-incorporated water to pass therethrough and thereby generates nanobubbles in the gas-incorporated water. The ultrafine bubble generating nozzle used in the embodiment can generate a relatively large amount of nanobubbles per milliliter of gas-incorporated water by itself alone. For the ultrafine bubble generating nozzle 60 having such capability, for example, a nanobubble generating nozzle described in JP 6129390 B is applicable.

Figure 7:
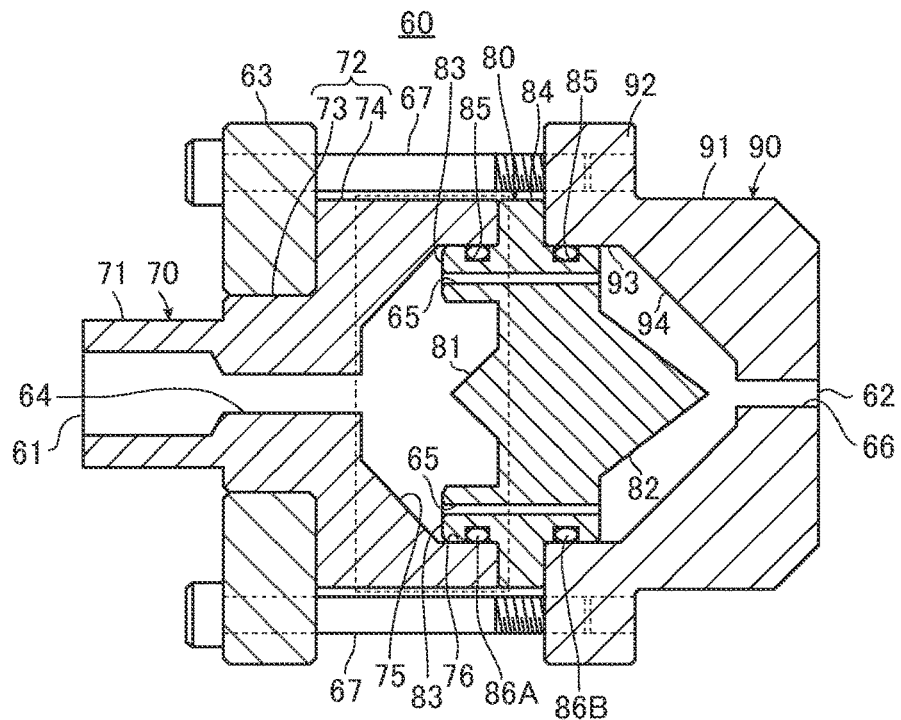
FIG. 7 is a cross-sectional side view of an ultrafine bubble generating nozzle.
Figure 8:
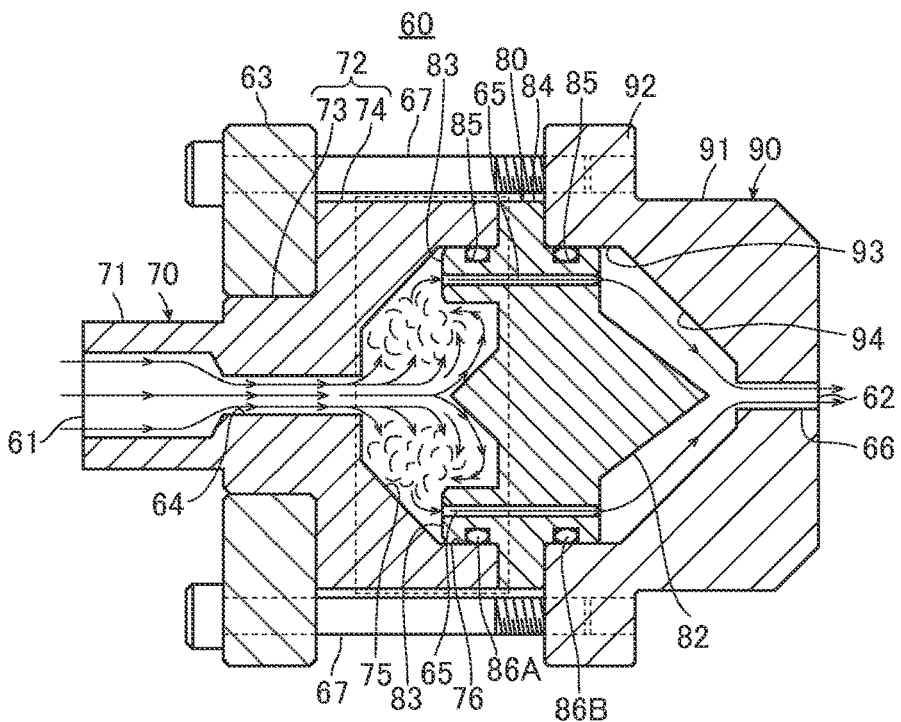
FIG. 8 is a view showing flow of liquid in the ultrafine bubble generating nozzle.

The configuration of the ultrafine bubble generating nozzle 60 according to the embodiment is described below by reference to FIGS. 7 and 8 showing the nanobubble generating nozzle described in JP 6129390 B. FIG. 7 is a cross-sectional side view of the ultrafine bubble generating nozzle 60. FIG. 8 is a view showing the flow of gas-incorporated water in the ultrafine bubble generating nozzle 60.

As shown in FIG. 7, the ultrafine bubble generating nozzle 60 includes an introduction port 61 and an ejection port 62. The introduction port 61 is an opening that introduces gas-incorporated water to the inside of the nozzle. The ejection port 62 is an opening from which water containing nanobubbles (i.e., nanobubble-containing water) is ejected. A portion where nanobubbles are generated is provided between the introduction port 61 and the ejection port 62 in the ultrafine bubble generating nozzle 60. In this portion, three water passage holes 64, 65 and 66 are formed to align in an axial direction of the ultrafine bubble generating nozzle 60 (hereinafter called "nozzle axial direction"). The three water passage holes 64, 65 and 66 are holes having sectional areas (more precisely, sectional areas of cross-sections obtained when the holes are cut with the nozzle axial direction being specified as the normal line) different from one another.

The configuration of the ultrafine bubble generating nozzle 60 is more specifically described. As shown in FIG. 7, the ultrafine bubble generating nozzle 60 is composed mainly of three components, namely, an introduction portion 70, an ejection portion 90 and a middle portion 80. The introduction portion 70 serves as a base end part (upstream-side end) of the ultrafine bubble generating nozzle 60 and includes the introduction port 61. The downstream-side end of the ejection portion 90 constitutes a tip part of the ultrafine bubble generating nozzle and includes the ejection port 62. The middle portion 80 is sandwiched between the introduction portion 70 and the ejection portion 90 in the nozzle axial direction.

When those three components (i.e., the introduction portion 70, the middle portion 80 and the ejection portion 90) are assembled, the three water passage holes 64, 65 and 66 are formed to align in the nozzle axial direction in the ultrafine bubble generating nozzle 60. As shown in FIG. 7, of the three water passage holes 64, 65 and 66, a first water passage hole 64 on the most upstream side is situated in the center of the ultrafine bubble generating nozzle 60 in a radial direction of the ultrafine bubble generating nozzle 60 (hereinafter called "nozzle radial direction"). A second water passage hole 65 in the middle position is situated on the outer side of the center of the ultrafine bubble generating nozzle 60 in the nozzle radial direction, and a third water passage hole 66 on the most downstream side is situated in the center of the ultrafine bubble generating nozzle 60 in the nozzle radial direction.

The configuration details of the introduction portion 70, the middle portion 80 and the ejection portion 90 are described. First, the introduction portion 70 is described. As shown in FIG. 7, the introduction portion 70 includes an introduction portion body 72 and a cylindrical projection part 71 projecting from the end face of the introduction portion body 72. The introduction portion body 72 has such a contour as obtained by stacking two cylindrical parts having different outer diameters (hereinafter called "small diameter part 73" and "large diameter part 74") in the nozzle axial direction. The small diameter part 73 is situated on the upstream side, and the large diameter part 74 is situated on the downstream side.

The first water passage hole 64, a tapered part 75 and a fitting part 76 are formed in the introduction portion body 72. The tapered part 75 adjoins the first water passage hole 64 on the downstream side of the first water passage hole 64 in the nozzle axial direction and increases in diameter toward the downstream side. The fitting part 76 adjoins the tapered part 75 on the downstream side of the tapered part 75. The fitting part 76 is situated at the downstream-side end of an internal space of the large diameter part 74 and fitted with the upstream-side end of the middle portion 80 when the ultrafine bubble generating nozzle 60 is assembled.

The cylindrical projection part 71 is smaller in outer diameter than the small diameter part 73 of the introduction portion body 72 and projects outward from the end face of the small diameter part 73 in the nozzle axial direction. The end of the cylindrical projection part 71 on the upstream side forms an open end, and this opening serves as the introduction port 61. The cylindrical projection part 71 is connected with the gas-incorporated water transport line 51. Gas-incorporated water having flown through the gas-incorporated water transport line 51 flows in the cylindrical projection part 71 via the introduction port 61 and then passes the first water passage hole 64 formed in the introduction portion body 72. As can be seen from FIG. 7, the diameter (bore diameter) of the first water passage hole 64 is smaller than the inner diameter of the cylindrical projection part 71.

Next, the middle portion 80 is described. As shown in FIG. 7, the middle portion 80 has a disc-like or substantially cylindrical outer shape. Conical protrusions 81 and 82 protrude separately from the opposite sides of a central part, in the nozzle radial direction, of the middle portion 80 (the opposite sides in the nozzle axial direction). Of the conical protrusions 81 and 82, a first conical protrusion 81 protruding from the upstream-side end face of the middle portion 80 has a function of allowing gas-incorporated water having passed the first water passage hole 64 to flow radially outward in the nozzle radial direction so that the water goes toward the second water passage hole 65, as shown in FIG. 8.

A second conical protrusion 82 protruding from the downstream-side end face of the middle portion 80 has a function of guiding gas-incorporated water having passed the second water passage hole 65 to the third water passage hole 66, as shown in FIG. 8.

The middle portion 80 is provided at its periphery with a ring part 83 formed over the entire circumference of the middle portion 80. The ring part 83 is provided with a plurality of through-holes penetrating the ring part 83 in the nozzle axial direction at certain intervals in the circumferential direction of the middle portion 80. Those through-holes form the second water passage hole 65. The diameter (bore diameter) of each of the through-holes forming the second water passage hole 65 is smaller than the diameter (bore diameter) of the first water passage hole 64. The value obtained by summing up the sectional areas of all the through-holes is smaller than the sectional area of the first water passage hole 64.

As shown in FIG. 7, the entrance of the second water passage hole 65 is situated on the upstream side of the end face of the middle portion 80 on which end face the first conical protrusion 81 is provided. The periphery of the first conical protrusion 81 is surrounded by the ring part 83.

Of the outer peripheral surface of the ring part 83, a middle region in the nozzle axial direction is provided with a flange part 84 extending outward in the nozzle radial direction. Of the outer peripheral surface of the ring part 83, two portions sandwiching the flange part 84 therebetween are provided with sealing grooves 85 separately, and O-rings 86A and 86B are separately fitted in the sealing grooves 85. The O-ring 86A fitted in one of the sealing grooves 85 on the upstream side of the flange part 84 abuts the inner peripheral surface of the large diameter part 74 (more precisely, the inner peripheral surface of the fitting part 76) of the introduction portion body 72 as shown in FIG. 7 and thereby provides sealing between contacting faces of the introduction portion 70 and the middle portion 80. The O-ring 86B fitted in the other of the sealing grooves 85 on the downstream side of the flange part 84 abuts the inner peripheral surface of an ejection portion body 91 (more precisely, the inner peripheral surface of a fitting part 93) as shown in FIG. 7 and thereby provides sealing between contacting faces of the ejection portion 90 and the middle portion 80.

Next, the ejection portion 90 is described. As shown in FIG. 7, the ejection portion 90 includes the ejection portion body 91 and a flange part 92. The ejection portion body 91 has a cylindrical or substantially cylindrical outer shape. The internal space of the ejection portion body 91 is provided with the fitting part 93, a tapered part 94 and the third water passage hole 66. The fitting part 93 is situated on the upstream-side end of the internal space of the ejection portion body 91 and fitted with the ring part 83 of the middle portion 80. The tapered part 94 adjoins the fitting part 93 on the downstream side of the fitting part 93 in the nozzle axial direction and decreases in diameter toward the downstream side.

The third water passage hole 66 adjoins the tapered part 94 on the downstream side of the tapered part 94 in the nozzle axial direction. The third water passage hole 66 extends up to the downstream-side end face of the ejection portion body 91. In other words, a terminal opening of the third water passage hole 66 is formed in the downstream-side end face of the ejection portion body 91, and this opening serves as the ejection port 62.

The diameter (bore diameter) of the third water passage hole 66 is smaller than the diameter (bore diameter) of the first water passage hole 64. The sectional area of the third water passage hole 66 is smaller than the value obtained by summing up the sectional areas of all the through-holes forming the second water passage hole 65 (hereinafter called "sectional area of the second water passage hole 65" for convenience). Now, the sectional area ratio of the water passage holes is described. The sectional area ratio of the water passage holes is designed to satisfy the following: (Sectional area of first water passage hole 64):(Sectional area of second water passage hole 65):(Sectional area of third water passage hole 66)=3:2:1 (approximately). When the sizes of the water passage holes are determined to satisfy the foregoing ratio, nanobubbles can be effectively generated by the ultrafine bubble generating nozzle 60.

The diameter of the third water passage hole 66, i.e., the bore diameter of the ejection port 62 is smaller than each of the inner diameters of the respective sections (namely, the inner diameters of the first uniform diameter section 43a, the diameter increasing section 43b and the second uniform diameter section 43c) of the liquid passing portion 43 of the gas incorporating device body 42. Accordingly, the flow of gas-incorporated water is somewhat blocked at the ejection port 62 of the ultrafine bubble generating nozzle 60. As a consequence, the pressure of water becomes positive (in other words, does not become negative) in the respective sections of the liquid passing portion 43 of the gas incorporating device body 42 situated on the upstream side of the ultrafine bubble generating nozzle 60.

The flange part 92 is provided at, of the outer peripheral surface of the ejection portion body 91, the end on the upstream side in the nozzle axial direction to extend outward in the nozzle radial direction. The flange part 92 is mounted to a holder 63 when the introduction portion 70, the middle portion 80 and the ejection portion 90 are assembled together.

Specifically, the holder 63 is an annular member, and the small diameter part 73 of the introduction portion body 72 is fitted into the holder 63 as shown in FIG. 7. The holder 63 having the small diameter part 73 fitted therein is retained by a step between the small diameter part 73 and the large diameter part 74. The holder 63 is provided with a plurality of bolt holes at regular intervals in the circumferential direction. Correspondingly, the flange part 92 of the ejection portion 90 is also provided with the same number of bolt holes (more precisely, internally threaded bolt holes) as the number of the bolt holes of the holder 63. After the introduction portion 70, the middle portion 80 and the ejection portion 90 are assembled together, bolts 67 are inserted into the bolt holes of the holder 63, and the tips of the bolts 67 are threadedly engaged with the bolt holes of the flange part 92. Thus, the ultrafine bubble generating nozzle 60 is assembled.

Next, a mechanism for generating nanobubbles by the ultrafine bubble generating nozzle 60 configured as above is described. Gas-incorporated water having flown through the gas-incorporated water transport line 51 enters the cylindrical projection part 71 via the introduction port 61 and then passes the first water passage hole 64 formed in the introduction portion body 72. At this time, gas in the gas-incorporated water changes to ultrafine bubbles (nanobubbles) according to the principle of pressurized dissolution.

More specifically, when gas-incorporated water enters the first water passage hole 64, gas in the gas-incorporated water is further pressurized whereby the gas is dissolved into the water. The gas-incorporated water then flows out of the first water passage hole 64 and enters the tapered part 75. At this time, the gas-incorporated water is released from the pressurized state so that nanobubbles are generated.

The gas-incorporated water having entered the tapered part 75 further flows toward the downstream side in the tapered part 75. At this time, as shown in FIG. 8, the gas-incorporated water is guided outward in the nozzle radial direction by the first conical protrusion 81 and flows toward the second water passage hole 65. The periphery of the first conical protrusion 81 is surrounded by the ring part 83. Therefore, the gas-incorporated water flowing outward in the nozzle radial direction collides against the inner wall of the ring part 83 and flows back toward the upstream side as shown in FIG. 8. Consequently, the flow of the gas-incorporated water becomes turbulent flow. Owing to the flow of the gas-incorporated water having become turbulent flow, a shearing force is exerted on relatively large bubbles in the gas-incorporated water so that the bubbles are cut into fine pieces.

As shown in FIG. 8, the gas-incorporated water flowing as turbulent flow returns to the upstream side beyond the end face of the middle portion 80 on which end face the first conical protrusion 81 is provided and flows into the second water passage hole 65 situated on the upstream side of the end face. Thereafter, the gas-incorporated water in the turbulent state flows out of the second water passage hole 65 and enters the tapered part 94 in the ejection portion 90 from the second water passage hole 65. At this time, gas in the gas-incorporated water (specifically, gas dissolved in the water) changes to nanobubbles.

More specifically, gas that does not form nanobubbles when the gas-incorporated water passes the first water passage hole 64 is again pressurized and dissolved into the water when the gas-incorporated water passes the second water passage hole 65. Then, when the water in the second water passage hole 65 flows out of the second water passage hole 65, the gas-incorporated water is released from the pressurized state so that nanobubbles are generated.

In the embodiment, the diameter (bore diameter) of each of the through-holes forming the second water passage hole 65 is smaller than the diameter of the first water passage hole 64, and the sectional area of the second water passage hole 65 is smaller than the sectional area of the first water passage hole 64. When the gas-incorporated water passes the second water passage hole 65 having such a small sectional area, bubbles finer than those generated when the water passed the first water passage hole 64 are generated.

The gas-incorporated water having entered the tapered part 94 contains a certain amount of nanobubbles at that time. The gas-incorporated water in this state is guided inward in the nozzle radial direction by the second conical protrusion 82 and flows toward the third water passage hole 66. Then, the gas-incorporated water passes the third water passage hole 66 and is ejected from the ejection port 62 situated at the terminal end of the hole 66 toward the outside of the ultrafine bubble generating nozzle 60. When the gas-incorporated water passes the third water passage hole 66, the third water passage hole 66 acts to change gas in the gas-incorporated water (specifically, gas dissolved in the water) to nanobubbles, as with the first water passage hole 64 and the second water passage hole 65.

In the embodiment, the sectional area of the third water passage hole 66 is smaller than the sectional area of the second water passage hole 65. Therefore, the third water passage hole 66 properly pressurizes the gas-incorporated water flowing therethrough. As a result, gas in the gas-incorporated water (specifically, gas dissolved in the water) is properly pressurized and dissolved into the water. Then, when the gas-incorporated water passes the third water passage hole 66 and is ejected from the ejection port 62 toward the outside of the ultrafine bubble generating nozzle 60, the gas-incorporated water is released from the pressurized state so that nanobubbles are generated.

An increase in the pressure of the gas-incorporated water in the third water passage hole 66 provides the gas-incorporated water with a proper flow rate. Owing to this, when the gas-incorporated water is, as nanobubble-containing water, ejected out of the ultrafine bubble generating nozzle 60 from the ejection port 62, the water is ejected with a predetermined flow velocity.

As described above, the bore diameter of the ejection port 62 is smaller than each of the inner diameters of the respective sections (the first uniform diameter section 43a, the diameter increasing section 43b and the second uniform diameter section 43c) of the liquid passing portion 43 of the gas incorporating device body 42 situated on the upstream side of the ultrafine bubble generating nozzle 60. Accordingly, the amount of ejection of nanobubble-containing water from the ejection port 62 is determined depending on the bore diameter of the ejection port 62. Therefore, even when the inner diameter of the liquid passing portion 43 is reduced in the gas incorporating device body 42, this configuration has only a little influence on the amount of ejection of nanobubble-containing water.

However, the bore diameter of the ejection port 62 is not limited to the one smaller than each of the inner diameters of the respective sections (the first uniform diameter section 43a, the diameter increasing section 43b and the second uniform diameter section 43c) of the liquid passing portion 43 of the gas incorporating device body 42, and may be equal to or greater than any of those inner diameters.

As described above, nanobubbles are generated in gas-incorporated water in the ultrafine bubble generating nozzle 60 in plural steps (in the embodiment, three steps); specifically, nanobubbles are generated in gas-incorporated water when the water is passed through each water passage hole. Aside from that, in the embodiment, the respective passing holes are formed at different positions in the nozzle radial direction. With this configuration, the ultrafine bubble generating nozzle 60 can have a shorter length in the nozzle axial direction compared to the case where the respective passing holes are formed at the same position in the nozzle radial direction, and thus the ultrafine bubble generating nozzle 60 can be further compact.

Whilst the configuration of the ultrafine bubble generating nozzle 60 according to the embodiment is described above, the invention is not limited to this configuration, and any configuration may be applied as long as it allows nanobubbles to be generated in gas-incorporated water when the gas-incorporated water passes the inside of the nozzle 60, and the configuration may be different from that illustrated in FIG. 7.

Figure 9:
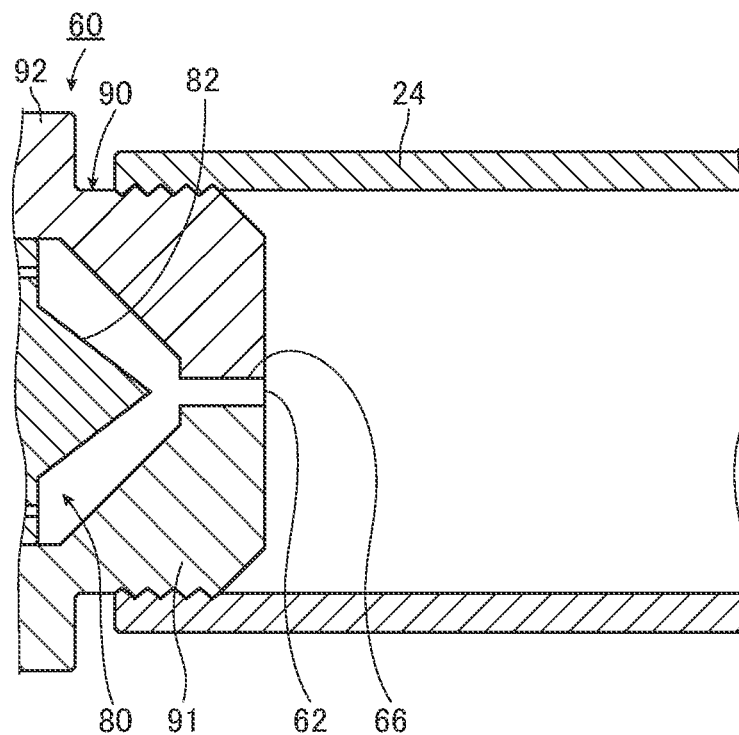
FIG. 9 is a cross-sectional view showing a connection structure between a tip part of the ultrafine bubble generating nozzle and a flow path.

The downstream-side end of the ejection portion body 91 (the end on the side where the ejection port 62 is provided) that constitutes the tip part of the ultrafine bubble generating nozzle 60 is connected to the flow path 20. More specifically, the outer peripheral surface of the downstream-side end of the ejection portion body 91 is provided with an external thread, as shown in FIG. 9. FIG. 9 is a cross-sectional view showing a connection structure between the tip part of the ultrafine bubble generating nozzle 60 and the flow path 20.

As shown in FIG. 2, a communication portion 24 extends from an intermediate position of the first flow path 21. The communication portion 24 is provided to allow the tip part of the ultrafine bubble generating nozzle 60 to communicate with the first flow path 21 and is constituted of a branch pipe joined to a steel pipe constituting the first flow path 21. The terminus of the branch pipe constituting the communication portion 24 has an internal thread formed on its inner peripheral surface.

The external thread of the ejection portion body 91 is engaged with the internal thread of the communication portion 24 as shown in FIG. 9, whereby the downstream-side end of the ejection portion body 91, which is the tip part of the ultrafine bubble generating nozzle 60, is connected to the first flow path 21 via the communication portion 24.

Defining the position where the downstream-side end of the ejection portion body 91 is connected to the first flow path 21 as a connection point 25, the connection point 25 is the position on the first flow path 21 where an end of the communication portion 24 is joined to the first flow path 21. As shown in FIGS. 1 and 2, this position is situated on the downstream side of the branch point 23 on the flow path 20 and also on the downstream side of the intake port 31 of the liquid discharger 30. In other words, the tip part of the ultrafine bubble generating nozzle 60 is connected to the first flow path 21 on the downstream side of the intake port 31 of the liquid discharger 30 and also on the downstream side of the branch point 23.

Note that a connection method between the tip part of the ultrafine bubble generating nozzle 60 and the flow path 20 is not limited to that described above, and other connection methods are applicable as long as the tip part of the ultrafine bubble generating nozzle 60 can be suitably connected to the flow path 20. For instance, the tip part of the ultrafine bubble generating nozzle 60 may be directly welded to the communication portion 24, or alternatively, flanges may be provided separately on both the tip part of the ultrafine bubble generating nozzle 60 and the communication portion 24 such that the flanges are joined to each other.

<<Configuration Details of Flow Path 20>>

Next, the configuration of the flow path 20 described above is again described.

In the flow path 20 according to the embodiment, nanobubble-containing water ejected from the tip part of the ultrafine bubble generating nozzle 60 flows through the communication portion 24 and joins water in the first flow path 21 (i.e., nanobubble-free water) at the connection point 25 between the tip part of the ultrafine bubble generating nozzle 60 and the first flow path 21. That is, respective portions of the ultrafine bubble generating apparatus 10 are designed to allow nanobubble-containing water to properly join water in the first flow path 21.

Specifically, the pressure of nanobubble-containing water ejected from the tip part of the ultrafine bubble generating nozzle 60 at the connection point 25 is higher than the pressure of water in the flow path 20 (more precisely, the first flow path 21) at the connection point 25. When the former pressure is denoted by Pa and the latter pressure is denoted by Pbn, the two pressures satisfy the following relational expression (1a):

$$Pbn > Pa \quad (1a)$$

The pressure Pbn is calculated by the following formula (1b):

$$Pbn = Pb - \Delta Pb \quad (1b)$$

where the discharge pressure when the liquid discharger 30 discharges water is denoted by Pb, and a pressure loss from the discharge port 32 of the liquid discharger 30 to the connection point 25 is denoted by ΔPb.

Accordingly, Pa, Pb and ΔPb satisfy the following relational expression (1):

$$Pb - \Delta Pb > Pa \quad (1)$$

In the embodiment, the liquid discharger 30, the gas incorporating device 40 and the ultrafine bubble generating nozzle 60 are designed to satisfy the relational expression (1) above. Therefore, nanobubble-containing water ejected from the tip part of the ultrafine bubble generating nozzle 60 smoothly joins nanobubble-free water in the first flow path 21 at the connection point 25.

Although pulsating, the discharge pressure Pb remains substantially constant while the liquid discharger 30 continuously operates under certain operation conditions; specifically, since the discharge pressure Pb is determined based on the discharge flow rate Vb of water, when the discharge flow rate Vb is measured, the discharge pressure Pb can be obtained from the measurement result and the performance curve shown in FIG. 4. The discharge pressure Pb can be actually measured by, for instance, installing a known pressure gauge or compound gauge at a suitable height (specifically, at the same height as the discharge port 32) in the vicinity of the discharge port 32 of the liquid discharger 30 and reading a value indicated by the gauge.

The pressure loss ΔPb is a pressure loss generated while water discharged from the liquid discharger 30 passes the ultrafine bubble generating nozzle 60 and flows up to the connection point 25 as nanobubble water. More precisely, the pressure loss ΔPb is a pressure loss generated when water passes the pressurized water transport line 50, the liquid passing portion 43 of the gas incorporating device body 42, the gas-incorporated water transport line 51, the inside of the sight glass 52, the pressurized water transport line 50, and the ultrafine bubble generating nozzle 60 at the discharge flow rate Vb. The pressure loss ΔPb can be calculated by a known calculation method.

Meanwhile, although pulsating, the pressure Pa of water in the flow path 20 at the connection point 25 remains substantially constant while the water flows at a constant flow rate in the first flow path 21; and the pressure Pa can be actually measured by, for instance, installing a known pressure gauge or compound gauge at a suitable height (specifically, at the same height as the connection point 25) in the vicinity of the connection point 25 on the first flow path 21 and reading a value indicated by the gauge. In measurement of the pressure Pa, it is preferable to measure the pressure with the water flow rate regulating valve 22V being closed (that is, in the state where nanobubble-containing water is not ejected from the ultrafine bubble generating nozzle 60).

The pressure Pa may be calculated using a difference between a pressure Pas immediately after water comes out of the supply source Ws and a pressure loss ΔPa generated while the water transported from the supply source Ws flows up to the connection point 25. The pressure Pas herein is the discharge pressure of the pressure-feeding device P when water is pressure-fed from the supply source Ws by the pressure-feeding device P such as a pump, and is a water pressure (water head pressure) corresponding to a height difference (fall) from the supply source Ws when water is transported by use of the height difference. In the case where water is transported by use of both the pressure-feeding device P and the height difference from the supply source Ws, a pressure obtained by adding together a discharge pressure of the pressure-feeding device P and a water head pressure corresponding to the height difference is the pressure Pas.

The pressure loss ΔPa can be obtained by adding together a pressure loss ΔPa1 generated when water flows through the flow path 20 up to the branch point 23 at the same flow rate as that at the time when the water comes out of the supply source Ws and a pressure loss ΔPa2 generated when water flowing through the first flow path 21 flows from the branch point 23 up to the connection point 25. The pressure losses ΔPa1 and ΔPa2 can be calculated by a known calculation method.

Figure 10:
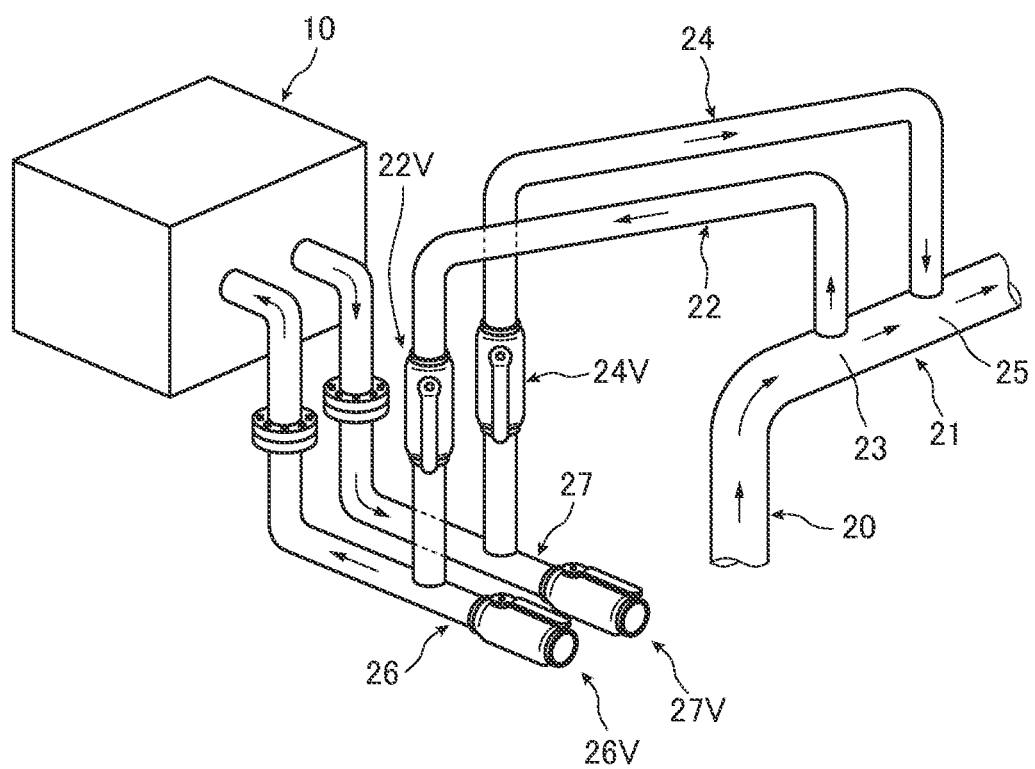
FIG. 10 is a perspective view showing a part of the flow path included in the liquid supply facility.

Next, accessory devices of the flow path 20 are described by reference to FIG. 10. FIG. 10 is a perspective view showing the flow path 20 connected to the ultrafine bubble generating apparatus 10.

The communication portion 24 allowing communication between the flow path 20 and the tip part of the ultrafine bubble generating nozzle 60 is installed to the flow path 20 (more precisely, the first flow path 21). As shown in FIG. 10, a first water drainage line 27 is provided at an intermediate position of the communication portion 24 for draining water from the communication portion 24.

The first water drainage line 27 corresponds to a first liquid drainage line and is joined to the communication portion 24 via a tee. The first water drainage line 27 is provided at its distal end with a first water drainage line switch valve 27V that switches between opening and closing of the first water drainage line 27, as shown in FIG. 10. The first water drainage line switch valve 27V corresponds to a first liquid drainage line switch valve and is constituted of a cock valve of manually openable and closable type.

The first water drainage line 27 and the first water drainage line switch valve 27V are disposed on the lowermost part of the communication portion 24, as shown in FIG. 10. Specifically, the communication portion 24 is disposed to extend vertically downward from a position slightly downstream from the point where the communication portion 24 is connected to the tip part of the ultrafine bubble generating nozzle 60, then be bent 90 degrees at the lowermost point of the vertical portion to extend in the horizontal direction, and again rise upward. The first water drainage line 27 is joined to the portion of the communication portion 24 that extends in the horizontal direction from the lowermost point. The first water drainage line 27 extends in the horizontal direction, and the first water drainage line switch valve 27V is attached to the distal end thereof.

Similarly, as shown in FIG. 10, a second water drainage line 26 and a second water drainage line switch valve 26V are provided to the second flow path 22. The second water drainage line 26 corresponds to a second liquid drainage line and is provided to drain water from the second flow path 22. The second water drainage line 26 is joined to the second flow path 22 via a tee. The second water drainage line switch valve 26V corresponds to a second liquid drainage line switch valve, is provided to switch between opening and closing of the second water drainage line 26, and is constituted of a cock valve of manually openable and closable type.

The second water drainage line 26 and the second water drainage line switch valve 26V are disposed on the lowermost part of the second flow path 22, as shown in FIG. 10. Specifically, the second flow path 22 is disposed to extend vertically downward from a position slightly downstream from the branch point 23 on the flow path 20, then be bent 90 degrees at the lowermost point of the vertical portion to extend in the horizontal direction, and again rise upward. The second water drainage line 26 is joined to the portion of the second flow path 22 that extends in the horizontal direction from the lowermost point. The second water drainage line 26 extends in the horizontal direction, and the second water drainage line switch valve 26V is attached to the distal end thereof.

As described above, in the embodiment, the second flow path 22 and the communication portion 24 are each provided with the water drainage line and the switch valve. This configuration makes it possible to drain water from each of the second flow path 22 and the communication portion 24 by opening the associated drainage line when, for example, the ultrafine bubble generating apparatus 10 will not be operated for a long time.

As shown in FIG. 10, the water flow rate regulating valve 22V is provided in the second flow path 22 on the upstream side of the second water drainage line 26 (specifically, of the second flow path 22, at an intermediate position in the portion extending vertically down toward the lowermost point). Further, as shown in FIG. 10, a communication portion switch valve 24V is provided in the communication portion 24 on the downstream side of the first water drainage line 27 (specifically, of the communication portion 24, at an intermediate position in the portion rising upward from the lowermost point). The communication portion switch valve 24V is provided to switch between opening and closing of the communication portion 24 and is constituted of a cock valve of manually openable and closable type.

<<Operation Example of Ultrafine Bubble Generating Apparatus 10>>

Next, an example of operation of the ultrafine bubble generating apparatus 10 having the above-described configuration is described.

When the operation of the ultrafine bubble generating apparatus 10 is started, first, the liquid discharger 30 is activated. At the time when the liquid discharger 30 is activated, water is already supplied from the supply source Ws and flows through the flow path 20. Before the liquid discharger 30 is activated, the switch valves are operated in advance.

Specifically, the water flow rate regulating valve 22V in the second flow path 22 is switched from the closed position to the open position. At this time, the communication portion switch valve 24V is in the closed position. Further, the first water drainage line switch valve 27V is opened, and the second water drainage line switch valve 26V is operated to the closed position. Consequently, the second flow path 22 is opened, so that water enters the liquid discharger 30 via the intake port 31 from the upstream side of the liquid discharger 30. In short, the liquid discharger 30 is primed. In addition, drainage is carried out through the first water drainage line 27 such that air accumulated in the pressurized water transport line 50, the liquid passing portion 43 of the gas incorporating device body 42, the gas-incorporated water transport line 51, the sight glass 52, the ultrafine bubble generating nozzle 60, and the communication portion 24 comes out along with water and is released to the atmosphere.

After drainage is carried out until accumulated air sufficiently comes out, the communication portion switch valve 24V is switched from the closed position to the open position, and the first water drainage line switch valve 27V is closed. Thereafter, the liquid discharger 30 is activated. In conjunction with the activation of the liquid discharger 30, the gas flow rate regulating valve 41b gradually opens from the closed position. Consequently, gas generated from the pressurized gas generation source 41 is introduced into the gas passing portion 44 of the gas incorporating device body 42 through the gas transport line 41a.

On the other hand, the liquid discharger 30 takes in water from the second flow path 22 via the intake port 31 and also pressurizes and discharges the taken water. At this time, the pressure of the water entering the liquid discharger 30 from the upstream side of the liquid discharger 30 (specifically, the pressure of water at the intake port 31) in the second flow path 22 is positive.

To be more specific, in the embodiment, water is supplied from the supply source Ws by use of at least one of the pressure-feeding device P and the height difference between the supply source Ws and the destination Wd. The water flows in the pressurized state through the flow path 20. The flow path 20 is branched at the branch point 23 into the first flow path 21 and the second flow path 22, and the second flow path 22 is connected to the intake port 31 of the liquid discharger 30. Thus, the water flowing through the second flow path 22 enters the liquid discharger 30 in the pressurized state (in other words, with its pressure being positive).

The water discharged from the liquid discharger 30 flows through the pressurized water transport line 50 and then enters the liquid passing portion 43 of the gas incorporating device body 42. The flow velocity (linear velocity) of the water changes stepwise while the water is flowing through the liquid passing portion 43.

More specifically, when the water enters the first uniform diameter section 43a of the liquid passing portion 43 from the pressurized water transport line 50, the flow velocity of the water sharply increases. Subsequently, when the water travels from the first uniform diameter section 43a to the diameter increasing section 43b, the flow velocity of the water gradually decreases. Thereafter, the water travels from the diameter increasing section 43b to the second uniform diameter section 43c, and the flow velocity of the water remains substantially constant while the water flows through the second uniform diameter section 43c. The flow velocity at this time is far higher than that when the water flows through the pressurized water transport line 50.

Immediately after water enters the second uniform diameter section 43c in the liquid passing portion 43, the gas incorporating device 40 pressurizes gas and incorporates the gas into the water in the second uniform diameter section 43c.

More specifically, the pressure of water in the second uniform diameter section 43c is positive, and the pressure value is slightly lower than the discharge pressure Pb of the liquid discharger 30 (specifically, lower by a value equivalent to a pressure loss generated while water discharged from the liquid discharger 30 at the discharge flow rate Vb flows up to the second uniform diameter section 43c). Meanwhile, gas supplied from the pressurized gas generation source 41 through the gas transport line 41a passes the gas passing portion 44. At this time, the pressure of the gas in the gas passing portion 44 (i.e., the incorporation pressure Pi) is higher than the discharge pressure Pb. Accordingly, the gas is introduced into the second uniform diameter section 43c and incorporated into the water in the second uniform diameter section 43c against the pressure of the water in the second uniform diameter section 43c.

The relationship between the discharge pressure Pb and the incorporation pressure Pi is described. The embodiment is configured to generate a relatively large amount of nanobubbles in water by means of the single ultrafine bubble generating nozzle 60. To generate a large amount of nanobubbles in water, the higher the pressure of the water (more precisely, gas-incorporated water) at the introduction port 61 of the ultrafine bubble generating nozzle 60, the better; accordingly, it is also desirable to set the discharge pressure Pb as high as possible.

However, the higher the discharge pressure Pb, the harder it is to incorporate gas into water. Therefore, in the embodiment, the incorporation pressure Pi is set higher than the discharge pressure Pb, whilst the discharge pressure Pb is set as high as possible. In other words, in the embodiment, a pressure balance between the discharge pressure Pb and the incorporation pressure Pi is properly set for the sake of efficiency of nanobubble generation and reliable incorporation of gas into water.

In the embodiment, the gas flow rate regulating valve 41b is provided at an intermediate point of the gas transport line 41a through which gas flows, and a maximum permissible working pressure Pt of the gas flow rate regulating valve 41b, the discharge pressure Pb and the incorporation pressure Pi satisfy the following relational expression (2).

$$Pb > Pi > Pt \qquad (2)$$

When the above relational expression (2) is satisfied, the incorporation pressure Pi can be set so as not to exceed the limit of pressure resistance of the gas flow rate regulating valve 41b (i.e., the maximum permissible working pressure Pt), and more specifically, the incorporation pressure Pi can be set as high as possible within a range not exceeding the maximum permissible working pressure Pt. When the incorporation pressure Pi can be set higher, the discharge pressure Pb can also be set higher accordingly, and this allows more efficient generation of nanobubbles.

The maximum permissible working pressure Pt of the gas flow rate regulating valve 41b is defined in "JIS B 0100" and means "the maximum permissible pressure of a pressure-resistant portion of a valve at a specified temperature."

In the liquid passing portion 43, the water flows through the second uniform diameter section 43c with its flow velocity being accelerated as described above. The gas enters the second uniform diameter section 43c at a reduced flow rate and also receives a shearing force from the water flowing through the second uniform diameter section 43c and is thereby cut into fine pieces. As a result, gas in the form of fine bubbles is incorporated into the water.

After flowing out of the second uniform diameter section 43c, the water in which gas is incorporated (i.e., gas-incorporated water) flows through the gas-incorporated water transport line 51 toward the ultrafine bubble generating nozzle 60. At this time, the gas-incorporated water flows through the sight glass 52 provided at an intermediate point of the gas-incorporated water transport line 51. The degree of incorporation of gas in the gas-incorporated water can be visually observed by means of the sight glass 52.

The gas-incorporated water flowing through the gas-incorporated water transport line 51 toward the downstream side subsequently enters the ultrafine bubble generating nozzle 60 via the introduction port 61. When the gas-incorporated water passes the three water passage holes 64, 65 and 66 in the ultrafine bubble generating nozzle 60, nanobubbles are generated in the gas-incorporated water.

The nanobubble-containing water is ejected from the ejection port 62 formed in the tip part of the ultrafine bubble generating nozzle 60. Here, the amount of ejection of nanobubble-containing water depends not on any of the inner diameters of the respective sections (the first uniform diameter section 43a, the diameter increasing section 43b and the second uniform diameter section 43c) of the liquid passing portion 43 of the gas incorporating device body 42 situated on the upstream side of the ultrafine bubble generating nozzle 60 but on the bore diameter of the ejection port 62. In this respect, the embodiment is more advantageous than a conventional configuration in which gas is sucked in and incorporated into liquid by generating negative pressure in a liquid passing portion of a gas incorporating device body.

More specifically, in the conventional configuration, to generate negative pressure at an intermediate position of the liquid passing portion, the inner diameter at that position is significantly reduced. Therefore, in the conventional configuration, the flow rate of water depends on the inner diameter (more precisely, the reduced inner diameter) of the liquid passing portion, and accordingly, the amount of ejection of nanobubble-containing water ejected from the ultrafine bubble generating nozzle 60 also depends on the inner diameter of the liquid passing portion.

In contrast, in the embodiment, each of the inner diameters of the respective sections of the liquid passing portion 43 is larger than the ejection port 62 of the ultrafine bubble generating nozzle 60. Thus, as described above, the amount of ejection of nanobubble-containing water depends not on any of the inner diameters of the respective sections but on the bore diameter of the ejection port 62. In other words, in the embodiment, the inner diameter of the liquid passing portion 43 is reduced at its intermediate position but does not affect the amount of ejection of nanobubble-containing water.

The nanobubble-containing water ejected from the ejection port 62 flows through the communication portion 24 and then reaches the connection point 25 on the first flow path 21. At the connection point 25, the nanobubble-containing water having flown through the communication portion 24 is mixed with water flowing through the first flow path 21 (that is, nanobubble-free water). The resulting mixed water is transported to a farm or an agricultural field that is the destination Wd of the water and finally sprinkled by a water sprinkling device D installed there.

Effectiveness of the Embodiment

In the embodiment, the liquid supply facility S includes the flow path 20 and the ultrafine bubble generating apparatus 10, and the liquid discharger 30 included in the ultrafine bubble generating apparatus 10 takes in water directly from the flow path 20 (more precisely, the second flow path 22). With this configuration, the discharge flow rate of the liquid discharger 30 can be increased compared to the case where water is taken in from a storage tank storing water having flown out of the flow path 20, thus making it possible to supply more nanobubble-containing water.

In the embodiment, the pressure of water entering the liquid discharger 30 from the upstream side of the liquid discharger 30, or more simply, the pressure of water at the intake port 31 in the flow path 20 is positive (that is, not negative). In this case, it is difficult to generate negative pressure on the intake port 31 side of the liquid discharger 30 to suck in gas and incorporate the gas into liquid as in conventional apparatuses. In particular, in the case where water in the pressurized state is supplied from the supply source Ws by use of the pressure-feeding device P as in the embodiment, it is more difficult to suck in gas on the intake port 31 side of the liquid discharger 30.

Therefore, in the embodiment, the gas incorporating device 40 pressurizes gas and incorporates the gas into liquid on the downstream side of the discharge port 32 of the liquid discharger 30.

Specifically, the incorporation pressure Pi at the time when gas is pressurized and incorporated into liquid is higher than the pressure of water passing a position where gas is incorporated by the gas incorporating device 40 (i.e., the upstream-side end of the second uniform diameter section 43c), and in the embodiment, is set higher than the discharge pressure Pb at the time when the liquid discharger 30 discharges water. Accordingly, gas enters the upstream-side end of the second uniform diameter section 43c and is incorporated into water against the pressure of the water at the upstream-side end of the second uniform diameter section 43c.

As described above, in the embodiment, since gas is incorporated into water on the downstream side of the liquid discharger 30, gas can be properly incorporated into water even with the pressure of the water at the intake port 31 being positive.

Meanwhile, it is desirable to set the discharge pressure Pb as high as possible in order to efficiently generate nanobubbles in water, as described above. However, the higher the discharge pressure Pb, the harder it is to incorporate gas into water. In the embodiment, the incorporation pressure Pi is set higher than the discharge pressure Pb, and owing to this, the discharge pressure Pb can be increased within a range not exceeding the incorporation pressure Pi. This makes it possible to efficiently generate nanobubbles whilst reliably incorporating gas into water.

In the embodiment, the flow path 20 is branched at the branch point 23 into the first flow path 21 and the second flow path 22, and the second flow path 22 is connected to the intake port 31 of the liquid discharger 30. The tip part of the ultrafine bubble generating nozzle 60 from which nanobubble-containing water is ejected is connected to the first flow path 21 via the communication portion 24. This configuration makes it possible to generate nanobubbles in water taken in from the second flow path 22, supply nanobubble-containing water into the first flow path 21, and deliver the nanobubble-containing water to the destination Wd through the first flow path 21.

Further, the pressure Pbn of nanobubble-containing water ejected from the ultrafine bubble generating nozzle 60 is higher than the pressure Pa of water (nanobubble-free water) flowing through the first flow path 21 at the connection point 25 of the flow path 20. In the liquid supply facility S, the relationship in magnitude of pressure as above is maintained, so that nanobubble-containing water can be smoothly supplied into the first flow path 21.

To maintain the magnitude relationship between the two pressures Pbn and Pa, for the liquid discharger 30, the machine type capable of establishing a favorable discharge pressure Pb is selected based on the pressure loss ΔPb generated between the discharge port 32 of the liquid discharger 30 and the connection point 25.

Further, in the embodiment, since the flow path 20 is branched, it is possible to deliver only nanobubble-free water to the destination Wd by closing the second flow path 22V to allow water to pass through only the first flow path 21 during the period that nanobubble-containing water is not needed. In contrast, during the period that nanobubble-containing water is needed, the flow rate of nanobubble-containing water can be controlled by regulating the opening of the water flow rate regulating valve 22V.

<<Regarding Power Supply to Ultrafine Bubble Generating Apparatus and Pressure-Feeding Device>>

Figure 11:
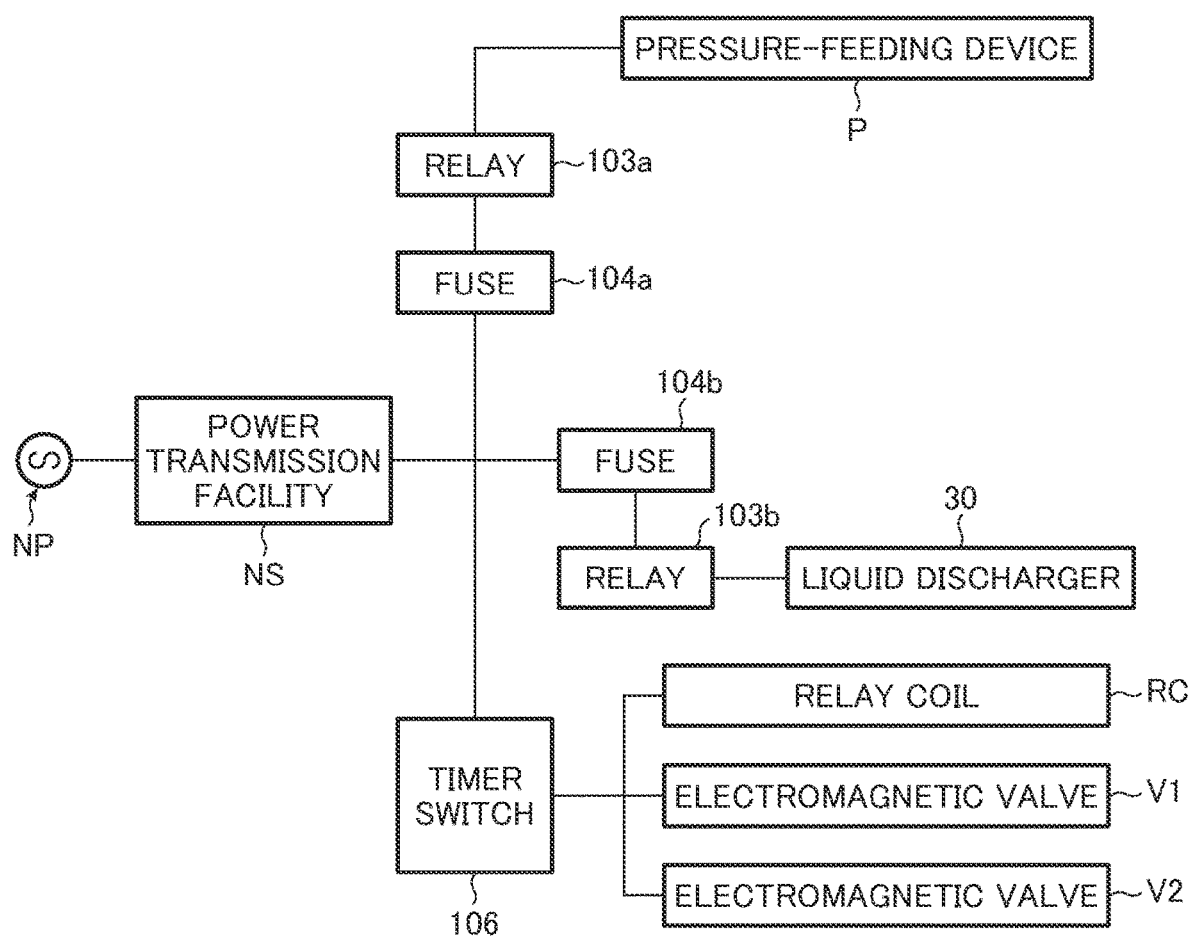
FIG. 11 is a view showing a power supply system for the ultrafine bubble generating apparatus and a pressure-feeding device.

Electrical equipment (specifically, for instance, the liquid discharger 30, driving devices for electromagnetic valves and relays, and the like) in the ultrafine bubble generating apparatus 10 operates in response to supply of electric power. Similarly, the pressure-feeding device P also operates in response to supply of electric power. One example of a power supply source for those devices is a common commercial power source NP shown in FIG. 11. FIG. 11 is a view showing a power supply system for the ultrafine bubble generating apparatus 10 and the pressure-feeding device P.

The commercial power source NP is a power source possessed by an electric power company. Electric power of the commercial power source NP is supplied through a power transmission facility NS (specifically, transformers, power transmission lines, distribution boards, electrical outlets, and the like) installed to transmit electric power of the commercial power source NP. The ultrafine bubble generating apparatus 10 and the pressure-feeding device P are connected to the power transmission facility NS as shown in FIG. 11 and operate in response to supply of electric power from the commercial power source NP.

Figure 12:
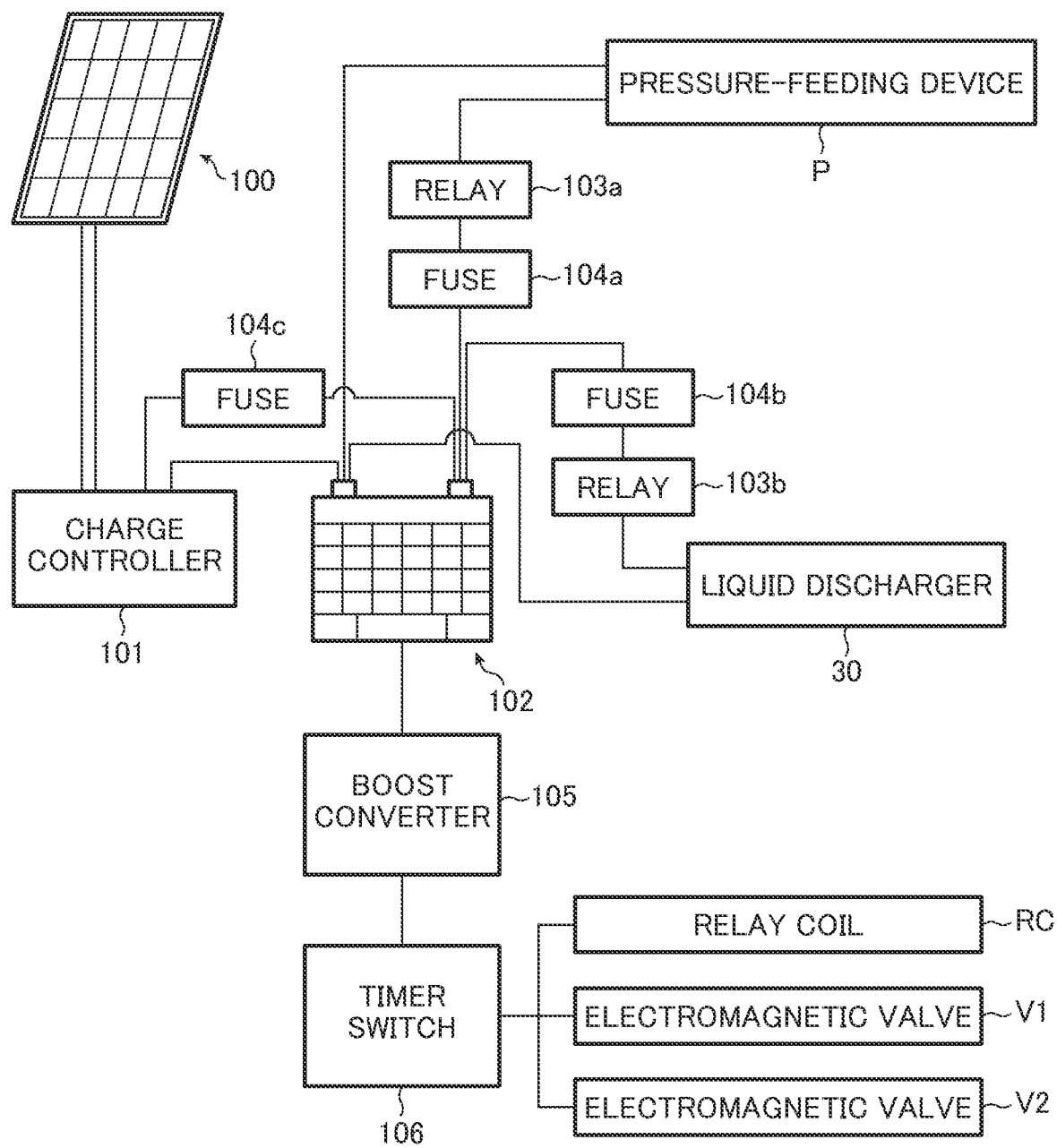
FIG. 12 is a view showing another example of a power supply system for the ultrafine bubble generating apparatus and the pressure-feeding device.

Meanwhile, the liquid supply facility S including the ultrafine bubble generating apparatus 10 and the pressure-feeding device P is sometimes used in a site having no power transmission facility NS, such as an outdoor agricultural field away from a building. In this case, since electric power of the commercial power source NP is not supplied, another power source than the commercial power source NP is necessary to operate the ultrafine bubble generating apparatus 10 and the pressure-feeding device P. One possible power source may be a power generating apparatus (in other words, a power generator) generating electric power from renewable energy. One example of the power generating apparatus is a solar panel 100 shown in FIG. 12. FIG. 12 is a view showing another example of a power supply system for the ultrafine bubble generating apparatus 10 and the pressure-feeding device P.

Examples of renewable energy include, in addition to sunlight, wind power, wave power, tidal power, running water, tide, geothermal heat, biomass, and other types of energy constantly or repeatedly replenished by the forces of nature; any power generating apparatus may be used as long as it generates electric power by using one type or plural types of energy in combination from among the foregoing types of energy.

The power supply system shown in FIG. 12 is described. The solar panel 100 is installed along with the ultrafine bubble generating apparatus 10 and the pressure-feeding device P in a site having no power transmission facility NS (hereinafter called a non-power receiving area). Electric power generated by the solar panel 100 from sunlight that is renewable energy is direct current power and is stored in a battery 102 shown in FIG. 12. When the battery 102 discharges, direct current power with a voltage of 12 V is supplied. A charge controller 101 is provided between the solar panel 100 and the battery 102 for the purpose of preventing the battery 102 from being overcharged and preventing the current from flowing back to the solar panel 100. Terminals of the charge controller 101 and terminals of the battery 102 are interconnected, and a fuse 104c is interposed between one pair of interconnected terminals.

As shown in FIG. 12, the liquid discharger 30 of the ultrafine bubble generating apparatus 10 and the pressure-feeding device P are connected to the battery 102 via relays 103a and 103b and fuses 104a and 104b. Further, an electromagnetic valve V1 (specifically, the gas flow rate regulating valve 41b) of the ultrafine bubble generating apparatus 10, an electromagnetic valve V2 provided in the flow path 20 as the siphonage prevention valve, and relay coils RC disposed in the relays 103a and 103b are connected to the battery 102 via a boost converter 105. That is, the foregoing devices connected to the battery 102 operate using electric power stored in the battery 102 (in other words, electric power generated by the solar panel 100).

The boost converter 105 boosts discharge power (direct current) output from the battery 102 from 12V to 24V, and the boosted electric power (direct current) is supplied to the electromagnetic valves V1 and V2 and the relay coils RC. Further, as shown in FIG. 12, a timer switch 106 serving as a controlling device is interposed between the boost converter 105 and the electromagnetic valves V1 and V2 and the relay coils RC. The timer switch 106 operates to switch between power being supplied and not supplied to the electromagnetic valves V1 and V2 and the relay coils RC, i.e., switch the operation states of those devices.

Specifically, when the timer switch 106 is turned on, electric power is supplied, so that the electromagnetic valves V1 and V2 are opened and also electric current flows through the relay coils RC. Accordingly, the pressure-feeding device P and the liquid discharger 30 of the ultrafine bubble generating apparatus 10 operate using discharge power output from the battery 102. As a consequence, nanobubble-containing water is supplied from the ultrafine bubble generating apparatus 10, and a non-power receiving area can be irrigated with the water. When the timer switch 106 is turned off, the power supply is discontinued, so that the electromagnetic valves V1 and V2 are closed whereby the operations of the pressure-feeding device P and the liquid discharger 30 stop; accordingly, the irrigation using nanobubble-containing water stops.

As described above, even for a non-power receiving area, the installation of the power generating apparatus generating electric power from renewable energy, such as the solar panel 100, makes it possible to use the pressure-feeding device P and the ultrafine bubble generating apparatus 10 advantageously. The foregoing power generating apparatus may be installed in a site where the power transmission facility NS is present so that electric power of the commercial power source NP is available (hereinafter called a power receivable area); in this case, the power generating apparatus is used as an auxiliary power source in the power receivable area.

Aside from that, when, for instance, a height difference (fall) between the water supply source Ws and the water destination Wd is used to supply water without use of the pressure-feeding device P, electric power generated from renewable energy by the power generating apparatus such as the solar panel 100 may be used solely for operating the ultrafine bubble generating apparatus 10.

Other Embodiments

One specific embodiment of the liquid supply facility of the invention has been described above; however, the foregoing embodiment is merely an example, and other examples are also applicable. Specifically, whilst nanobubble-containing water is mixed with nanobubble-free water and then supplied in the foregoing embodiment, nanobubble-containing water may be supplied as it is without being mixed with nanobubble-free water (without being diluted). This example is described with reference to FIG. 13. In a flow path 120 shown in the figure, there is only one portion extending from the supply source Ws (hereinafter called an upstream-side flow path 121), and the upstream-side flow path 121 is connected to the ultrafine bubble generating apparatus 10 (more precisely, to the intake port 31 of the liquid discharger 30). There is also only one portion extending toward the destination Wd (hereinafter called a downstream-side flow path 122), and the downstream-side flow path 122 is connected to the ultrafine bubble generating apparatus 10 (more precisely, to the tip part of the ultrafine bubble generating nozzle 60). Thus, the flow path 120 shown in FIG. 13 is not branched at its intermediate point, so that all of water flowing through the flow path 120 is routed to pass through the ultrafine bubble generating apparatus 10. In other words, in the configuration shown in FIG. 13, the ultrafine bubble generating apparatus 10 is arranged in series at an intermediate position of the single flow path 120.

Note that FIG. 13 is a schematic view showing the configuration of a liquid supply facility S according to a first modification.

In the foregoing embodiment, the flow path 20 is branched at its intermediate point; one of the branch flow paths (specifically, the second flow path 22) is connected to the intake port 31 of the liquid discharger 30 of the ultrafine bubble generating apparatus 10, and the other flow path (specifically, the first flow path 21) is connected to the tip part of the ultrafine bubble generating nozzle 60. However, the invention is not limited thereto, and as shown in FIG. 14, a water transport line extending to the ultrafine bubble generating apparatus 10 may be provided separately from another water transport line. Specifically, a flow path 220 shown in FIG. 14 includes a portion that extends from the supply source Ws toward the ultrafine bubble generating apparatus 10 (i.e., an upstream-side flow path 221), a portion that extends from the ultrafine bubble generating apparatus 10 toward the destination Wd (i.e., a downstream-side flow path 222), and separately from those portions, a portion that extends from the supply source Ws toward the destination Wd (hereinafter, called a separate flow path 223). As shown in FIG. 14, the upstream-side flow path 221 is connected to the ultrafine bubble generating apparatus 10, more precisely to the intake port 31 of the liquid discharger 30. The downstream-side flow path 222 is connected to the tip part of the ultrafine bubble generating nozzle 60 of the ultrafine bubble generating apparatus 10. The downstream-side end of the downstream-side flow path 222 is connected to the separate flow path 223 as shown in FIG. 14. Thus, nanobubble-containing water is delivered to the destination Wd through the separate flow path 223.

Note that FIG. 14 is a schematic view showing the configuration of a liquid supply facility S according to a second modification.

In FIG. 14, the flow path extending from the supply source Ws toward the ultrafine bubble generating apparatus 10 (i.e., the upstream-side flow path 221) and the flow path extending from the supply source Ws directly toward the destination Wd (i.e., the separate flow path 223) start from the same supply source Ws. The invention is, however, not limited thereto, and those flow paths may extend from different supply sources Ws, separately.

As shown in FIG. 15, the tip part of the ultrafine bubble generating nozzle 60 of the ultrafine bubble generating apparatus 10 need not be connected to one of the branch flow paths (specifically, the first flow path 21). Specifically, a flow path 320 shown in FIG. 15 is branched into a first flow path 321 and a second flow path 322 at its intermediate point. The first flow path 321 extends up to the destination Wd, and the second flow path 322 is connected to the intake port 31 of the liquid discharger 30 of the ultrafine bubble generating apparatus 10. The flow path 320 shown in FIG. 15 further includes a third flow path 323. The third flow path 323 is connected to the tip part of the ultrafine bubble generating nozzle 60 of the ultrafine bubble generating apparatus 10 and extends toward the destination Wd independently. Thus, as shown in FIG. 15, nanobubble-free water is supplied to the destination Wd through the first flow path 321, and nanobubble-containing water is supplied thereto through the third flow path 323, that is, through a separate system.

Note that FIG. 15 is a schematic view showing the configuration of a liquid supply facility S according to a third modification.

In the foregoing embodiment, the piping constituting the flow path continuously extends up to the ultrafine bubble generating apparatus 10 and the water destination Wd. The invention is not limited thereto, however, and as shown in FIG. 16, a water storage tank 424 may be provided at an intermediate position of a flow path 420 (specifically, a position on the upstream side of a branch point 423 where the flow path is branched into a first flow path 421 and a second flow path 422). The storage tank 424 is provided to temporarily store water supplied from the supply source Ws. Water supplied from the supply source Ws flows toward the storage tank 424 through the flow path 421 and is stored in the storage tank 424. Thereafter, the water in the storage tank 424 is pushed out of the storage tank 424 by a push-out device P2 such as a pump connected to a discharge outlet of the storage tank 424. The water pushed out of the storage tank 424 again flows through the flow path 420, and its flow is divided at the branch point 423, so that the water flows through the first flow path 421 and the second flow path 422 separately. Then, the water flowing through the first flow path 421 is taken into the intake port 31 of the liquid discharger 30, and the liquid discharger 30 discharges the taken water from the discharge port 32. Temporary storage of water supplied from the supply source Ws in the storage tank 424 as described above allows water clarification in the tank (where, for instance, trash and impurities in the water are settled) and regulation of water temperature in the tank by use of a temperature regulator (not shown). The volume of the storage tank 424 is not particularly limited and, when water is continuously supplied, is preferably 500 L or thereabout, for instance.

Note that FIG. 16 is a schematic view showing the configuration of a liquid supply facility S according to a fourth modification. Whilst the configuration illustrated in FIG. 16 is made by adding the storage tank 424 to the configuration illustrated in FIG. 1, the storage tank 424 may be added to other configurations (specifically, the configurations illustrated in FIGS. 13 to 15).

The foregoing embodiment is described taking the case where nanobubbles are generated in water used for the purpose of agriculture or plant cultivation as an example of the application of the invention. The application of the invention is not limited thereto, however, and the invention may be applied to cases where nanobubbles are generated in water for production of chemicals, water for production of foods, water for production of cosmetics, water used in the fishing industry (particularly, fish farming industry), washing water, water for medical use, drained water to be subjected to water treatment, and other types of water.

REFERENCE SIGNS LIST

- 10 ultrafine bubble generating apparatus
- 20 flow path
- 21 first flow path
- 22 second flow path
- 22V water flow rate regulating valve
- 23 branch point
- 24 communication portion
- 24V communication portion switch valve
- 25 connection point
- 26 second water drainage line
- 26V second water drainage line switch valve
- 27 first water drainage line
- 27V first water drainage line switch valve
- 28 nanobubble-containing water transport line
- 30 liquid discharger
- 31 intake port
- 32 discharge port
- 40 gas incorporating device
- 41 pressurized gas generation source
- 41a gas transport line
- 41b gas flow rate regulating valve
- 42 gas incorporating device body
- 43 liquid passing portion
- 43a first uniform diameter section
- 43b diameter increasing section
- 43c second uniform diameter section
- 44 gas passing portion
- 44a connection section
- 44b narrowed section
- 44c injection section
- 50 pressurized water transport line
- 51 gas-incorporated water transport line
- 52 sight glass
- 60 ultrafine bubble generating nozzle
- 61 introduction port
- 62 ejection port
- 63 holder
- 64, 65, 66 water passage hole
- 67 bolt
- 70 introduction portion
- 71 cylindrical projection part
- 72 introduction portion body
- 73 small diameter part
- 74 large diameter part
- 75 tapered part
- 76 fitting part
- 80 middle portion
- 81, 82 conical protrusion
- 83 ring part
- 84 flange part
- 85 sealing groove
- 86A, 86B O-ring
- 90 ejection portion
- 91 ejection portion body
- 92 flange part
- 93 fitting part
- 94 tapered part
- 100 solar panel
- 101 charge controller
- 102 battery
- 103a, 103b relay
- 104a, 104b, 104c fuse
- 105 boost converter
- 106 timer switch
- 120 flow path
- 121 upstream-side flow path
- 122 downstream-side flow path
- 220 flow path
- 221 upstream-side flow path
- 222 downstream-side flow path
- 223 separate flow path
- 320 flow path
- 321 first flow path
- 322 second flow path
- 323 third flow path
- 420 flow path
- 421 first flow path
- 422 second flow path
- 423 branch point
- 424 storage tank
- D water sprinkling device
- NP commercial power source
- NS power transmission facility
- P pressure-feeding device
- P2 push-out device
- RC relay coil
- S liquid supply facility
- V1, V2 electromagnetic valve
- Wd destination
- Ws supply source

The invention claimed is:

1. A liquid supply facility comprising:
   a flow path through which liquid supplied from a supply source of the liquid flows; and
   an ultrafine bubble generating apparatus generating ultrafine bubbles in liquid,
   wherein the flow path is branched at a branch point into a plurality of flow paths including a first flow path and a second flow path,
   wherein the ultrafine bubble generating apparatus includes:
   a liquid discharger discharging the liquid taken in from the second flow path;
   a gas incorporating device pressurizing gas and incorporating the gas into the liquid discharged from the liquid discharger, wherein the gas incorporating device comprises a gas incorporating device body; and
   an ultrafine bubble generator generating ultrafine bubbles in the liquid by allowing the liquid having the gas to pass through an inside of the ultrafine bubble generator,
   wherein the ultrafine bubbles generated by the ultrafine bubble generator are nanobubbles with a diameter of less than 1 μm, wherein a pressure of the liquid entering the liquid discharger from an upstream side of the liquid discharger in the second flow path is positive, wherein, in the gas incorporating device body disposed between the liquid discharger and the ultrafine bubble generator, the gas incorporating device incorporates the pressurized gas into liquid, and the liquid with the gas is in a pressurized state and flows toward the ultrafine bubble generator at a velocity greater than a velocity of the liquid flowing between the liquid discharger and the gas incorporating device body, and a flow rate of the pressurized gas is reduced in the gas incorporating device body compared to before the pressurized gas goes into the gas incorporating device body, wherein the ultrafine bubble generator is a nozzle having a water passage hole and generates the ultrafine nanobubbles in the liquid according to the principle of pressurized dissolution by allowing the liquid having the gas to pass through the water passage hole, and the ultrafine bubble generator ejects nanobubble-containing liquid from a tip part of the nozzle, and wherein the tip part of the nozzle is connected to the first flow path on a downstream side of the branch point where the flow path is branched.

2. The liquid supply facility according to claim 1,
wherein the second flow path is provided with at least one of a liquid flow rate regulating valve for regulating a flow rate of liquid flowing through the second flow path and a pressure reducing valve reducing a pressure of liquid flowing through the second flow path.

3. The liquid supply facility according to claim 1,
wherein a pressure of gas pressurized and incorporated into liquid by the gas incorporating device is higher than a pressure of liquid passing a position where gas is incorporated by the gas incorporating device.

4. The liquid supply facility according to claim 1,
wherein a pressure of the nanobubble-containing liquid ejected from the tip part of the nozzle at a connection point where the tip part of the nozzle is connected to the first flow path is higher than a pressure of liquid in the flow path at the connection point.

5. The liquid supply facility according to claim 4,
wherein Pa, Pb and ΔPb satisfy a relational expression (1):

$$Pb - \Delta Pb > Pa \qquad (1)$$

where a pressure of liquid in the flow path at the connection point is denoted by Pa,
a discharge pressure at a time when the liquid discharger discharges liquid is denoted by Pb, and
a pressure loss generated while liquid discharged from the liquid discharger passes the ultrafine bubble generator to turn into the nanobubble-containing liquid and flows up to the connection point is denoted by ΔPb.

6. The liquid supply facility according to claim 1,
wherein the liquid supply facility includes a communication portion allowing communication between the tip part of the nozzle and the first flow path,
wherein the tip part of the nozzle is connected to the first flow path via the communication portion,
wherein the communication portion is provided with a first liquid drainage line for draining liquid from the communication portion, and
wherein the second flow path is provided with a second liquid drainage line for draining liquid from the second flow path.

7. The liquid supply facility according to claim 6,
wherein the liquid discharger is a non-self-priming pump,
wherein the first liquid drainage line is provided with a first liquid drainage line switch valve that switches between opening and closing of the first liquid drainage line,
wherein the second liquid drainage line is provided with a second liquid drainage line switch valve that switches between opening and closing of the second liquid drainage line, and
wherein a communication portion switch valve that switches between opening and closing of the communication portion is provided in the communication portion on a downstream side of the first liquid drainage line.

8. The liquid supply facility according to claim 1,
wherein liquid supplied from the supply source by use of a pressure-feeding device that pressure-feeds liquid flows in a pressurized state through the flow path.

9. The liquid supply facility according to claim 1,
wherein the liquid supply facility includes a power generating apparatus generating electric power from renewable energy, and
wherein the ultrafine bubble generating apparatus operates using electric power generated by the power generating apparatus.

10. The liquid supply facility according to claim 9,
wherein the ultrafine bubble generating apparatus and the power generating apparatus are installed in a site having no power transmission facility transmitting electric power of a commercial power source.

11. The liquid supply facility according to claim 1,
wherein a storage tank for storing liquid is provided at branch point of the flow path, and
wherein the liquid discharger takes in, from the flow path, liquid having been stored in the storage tank and then flown out of the storage tank and discharges liquid.

12. The liquid supply facility according to claim 1,
wherein the nozzle that is the ultrafine bubble generator has the water passage hole at each of a plurality of locations along an axial direction of the nozzle, and generates nanobubbles in liquid by allowing liquid having gas incorporated therein to pass through the water passage hole at each of the plurality of locations.

* * * * *